United States Patent
Lin

(10) Patent No.: US 12,557,057 B2
(45) Date of Patent: Feb. 17, 2026

(54) METHOD FOR LANE SYNCHRONIZATION FOR AN INTERCONNECTION PROTOCOL, CONTROLLER, AND STORAGE DEVICE

(71) Applicant: SK hynix Inc., Icheon-si Gyeonggi-do (KR)

(72) Inventor: Fu Hsiung Lin, Zhubei (TW)

(73) Assignee: SK hynix Inc., Icheon-si (KR)

( * ) Notice: Subject to any disclaimer, the term of this patent is extended or adjusted under 35 U.S.C. 154(b) by 672 days.

(21) Appl. No.: 17/972,377

(22) Filed: Oct. 24, 2022

(65) Prior Publication Data

US 2024/0089886 A1    Mar. 14, 2024

(30) Foreign Application Priority Data

Sep. 8, 2022  (TW) .................................. 111134083

(51) Int. Cl.
*H04W 56/00*  (2009.01)
*H04W 88/02*  (2009.01)

(52) U.S. Cl.
CPC ..... *H04W 56/0065* (2013.01); *H04W 56/002* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 8,621,128 B2 | 12/2013 | Radulescu et al. | |
| 9,086,966 B2 | 7/2015 | Wagh et al. | |
| 9,515,686 B2 | 12/2016 | Kim et al. | |
| 9,720,866 B2 | 8/2017 | Hamada et al. | |
| 9,723,431 B2 | 8/2017 | Ranganathan | |
| 9,973,216 B2 | 5/2018 | Radulescu et al. | |
| 2004/0071250 A1* | 4/2004 | Bunton | H04L 25/14 375/372 |
| 2006/0047862 A1* | 3/2006 | Shearer | H04L 41/08 710/15 |
| 2009/0013056 A1* | 1/2009 | Weinstock | H04N 21/226 709/208 |
| 2013/0038582 A1* | 2/2013 | Yen | G09G 3/2096 345/204 |

(Continued)

*Primary Examiner* — San Htun
(74) *Attorney, Agent, or Firm* — WILLIAM PARK AND ASSOCIATES LTD.

(57) ABSTRACT

A method for lane synchronization for an interconnection protocol, a controller, and a storage device. The method is suitable for a first device capable of linking to a second device according to the interconnection protocol, and includes providing data representing a de-skew interval which indicates a time interval between two consecutive periodic de-skew patterns. Then performing, by a hardware protocol engine for implementing a link layer of the interconnection protocol, a periodic de-skew pattern transmission adaptively over lanes from the first device to the second device according to the de-skew interval and in response to communication status information between the first device and the second device. The hardware protocol engine is configured to send a de-skew pattern periodically according to the de-skew interval when the communication status information satisfies a criterion, and to postpone sending of the de-skew pattern when the communication status information does not satisfy the criterion.

29 Claims, 13 Drawing Sheets

(56) References Cited

U.S. PATENT DOCUMENTS

| | | | |
|---|---|---|---|
| 2015/0206273 A1* | 7/2015 | Jeon | G09G 5/006 |
| | | | 348/521 |
| 2017/0272231 A1* | 9/2017 | Chen | H04L 25/14 |
| 2018/0095923 A1* | 4/2018 | Lyer | G06F 13/4022 |
| 2019/0377846 A1* | 12/2019 | Hanchinal | G06F 13/4027 |
| 2021/0406411 A1 | 12/2021 | Amato et al. | |

* cited by examiner

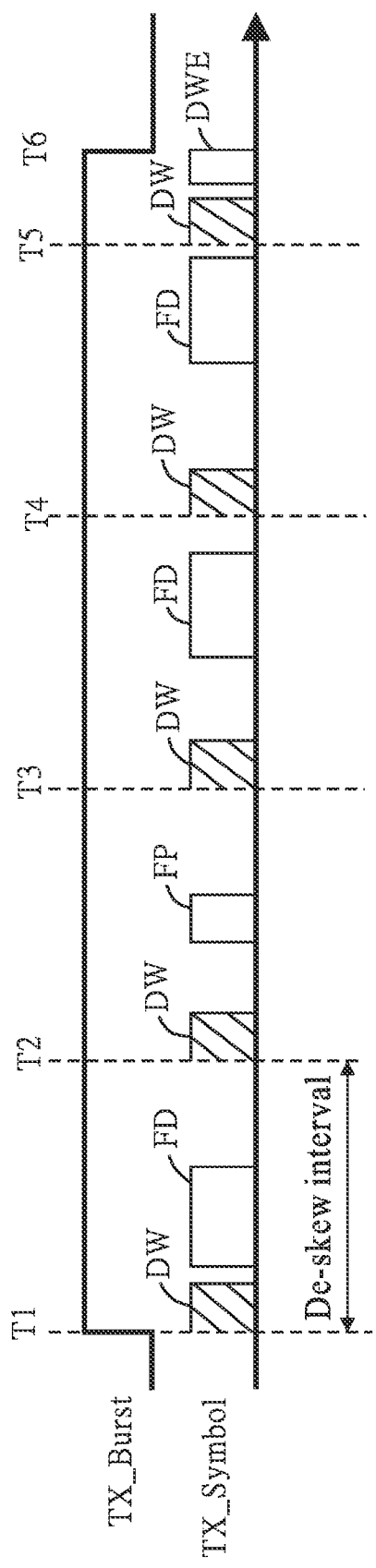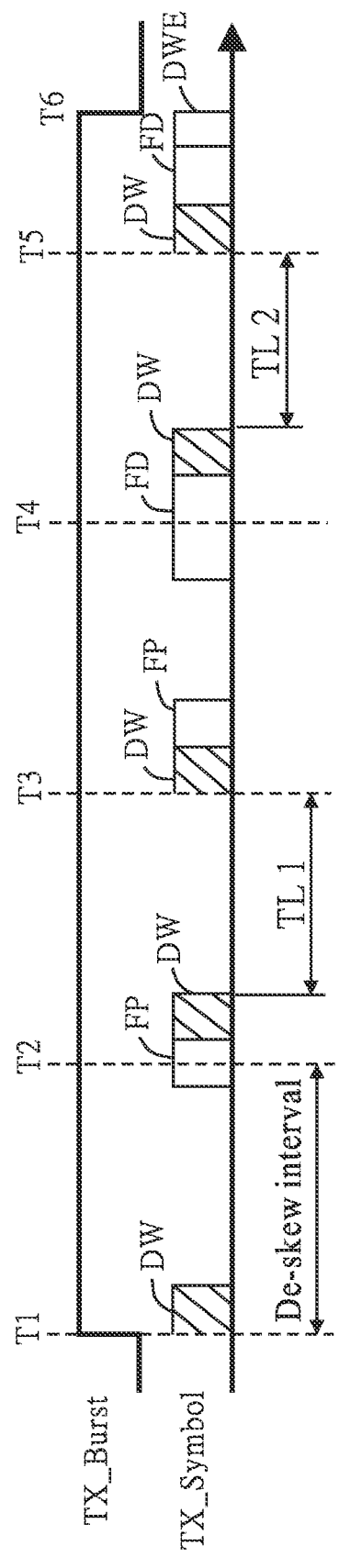
FIG. 4A
FIG. 4B

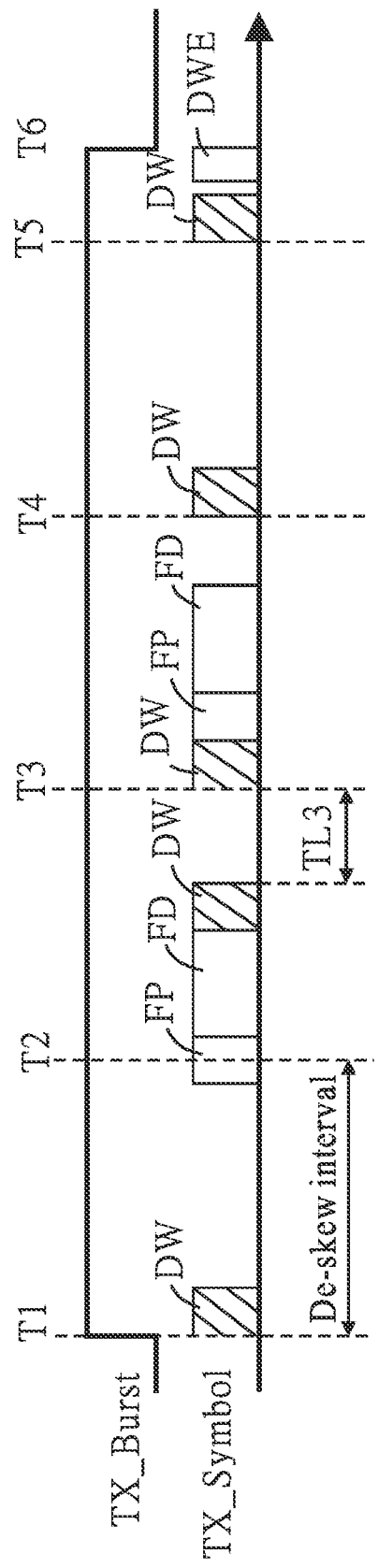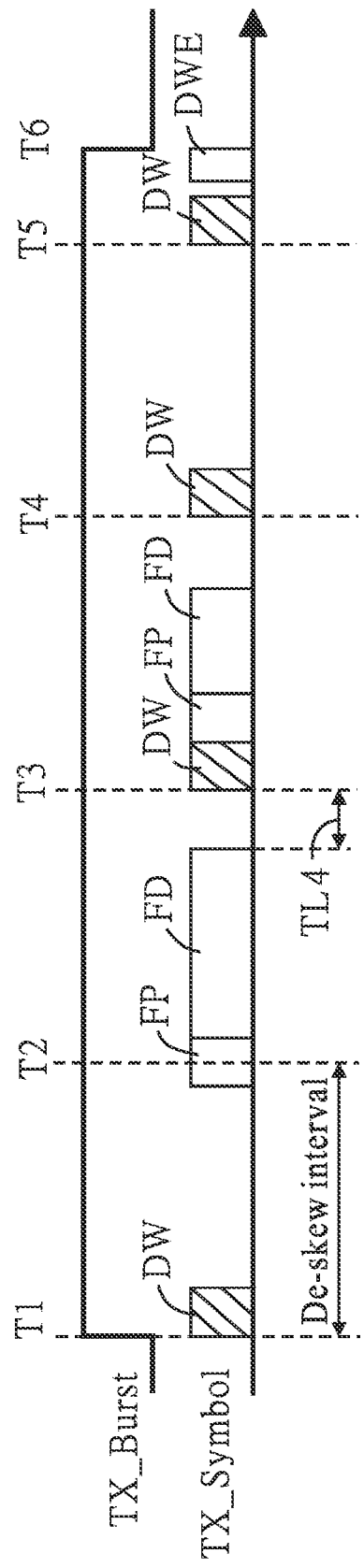

METHOD FOR LANE SYNCHRONIZATION FOR AN INTERCONNECTION PROTOCOL, CONTROLLER, AND STORAGE DEVICE

CROSS-REFERENCE TO RELATED APPLICATION

The present application claims priority under 35 U.S.C. § 119(a) to Taiwanese Patent Application No. 111134083 filed on Sep. 8, 2022, in the Taiwan Intellectual Property Office, which is incorporated herein by reference in its entirety.

BACKGROUND OF THE INVENTION

1. Field of the Invention

The present disclosure relates to an electronic device, and in particular to a method for lane synchronization for an interconnection protocol, a controller, and a storage device.

2. Description of the Related Art

In current mobile devices (for example, computing devices such as smartphones, tablet computers, multimedia devices, and wearable devices), the amounts of data sent and processed are continually increasing, and interconnection protocols from one chip to another inside the mobile devices or those affected by the mobile devices need to evolve further, so as to achieve goals of higher transmission speeds, low power consumption operations, expandability, support for multi-tasking, and convenient practicability.

In response, the Mobile Industry Processor Interface (MIPI) alliance has developed an interconnection protocol technology that meets the goals above, for example, the MIPI M-PHY associated with a physical layer and the MIPI UniPro specification associated with the Unified Protocol (UniPro). On the other hand, the Joint Electron Device Engineering Council (JEDEC), using the MIPI M-PHY specification and the MIPI UniPro specification, has launched a next-generation high-performance non-volatile memory standard that is referred to as Universal Flash Storage (UFS). The UFS realizes gigabit-level high-speed transmissions and low-power operations, and provides the functionality and expandability required for advanced mobile systems to facilitate rapid adoption by the industry.

When products developed based on these interconnection interface technologies are related chips, electronic modules, or electronic devices, it is necessary for technicians to ensure that the functions and operations of the products can meet the specifications. For example, a system that is implemented according to the UFS standard includes, for example, a computing device and a storage device implemented by a non-volatile memory, wherein the computing device and the storage device respectively serve as a local host and a remote device. A bidirectional link is established between the host and the device, and this link in between can be configured with multiple lanes in either of the transmission directions. Correspondingly, each of the host and the device is configured with a processing circuit that is capable of processing the multiple lanes according to the interconnection protocol of the UniPro specification.

In order to maintain the accuracy and performance of data transmission between the host and the device, the lanes between the host and the device need to be synchronized. Any skew occurring between the lanes may lead to a transmission error. With respect to the transmission error, the interconnection interface technique generally provides an error recovery mechanism to enable resuming of the transmission between the host and the device. However, the error recovery mechanism involves time-consuming processes, which undesirably affect the transmission performance between the host and the device or even degrades the transmission performance.

BRIEF SUMMARY OF THE INVENTION

A technique for lane synchronization for an interconnection protocol is provided by the present disclosure, and is suitable for a first device capable of linking to a second device according to the interconnection protocol. The technique is capable of adaptively utilizing periodic de-skew patterns in the interconnection protocol to promote lane synchronization during a communication process of the first device to the second device according to the interconnection protocol, thereby helping to reduce the occurrence of errors and improving transmission performance between a host and a device.

Various embodiments are provided below according to the technique, for example, a method for lane synchronization for an interconnection protocol, a controller, and a storage device.

A method for lane synchronization for an interconnection protocol is provided according to an embodiment of the present disclosure. The method is suitable for a first device capable of linking to a second device according to the interconnection protocol, and includes providing data representing a de-skew interval which indicates a time interval between two consecutive periodic de-skew patterns. Then performing, by a hardware protocol engine for implementing a link layer of the interconnection protocol, a periodic de-skew pattern transmission adaptively over lanes from the first device to the second device according to the de-skew interval and in response to communication status information between the first device and the second device. The hardware protocol engine is configured to send a de-skew pattern periodically according to the de-skew interval when the communication status information satisfies a criterion for performing the periodic de-skew pattern transmission, and to postpone sending of the de-skew pattern when the communication status information does not satisfy the criterion.

A controller is provided according to an embodiment of the present disclosure. The controller is suitable for a first device capable of linking to a second device according to an interconnection protocol, and includes an interface circuit and a hardware protocol engine. The interface circuit implements a physical layer of the interconnection protocol to link to the second device. The hardware protocol engine is coupled to the interface circuit and implements a link layer of the interconnection protocol. The hardware protocol engine is configured to perform a periodic de-skew pattern transmission adaptively over lanes from the first device to the second device according to a de-skew interval and in response to communication status information between the first device and the second device during a burst transmission. The de-skew interval indicates a time interval between two consecutive periodic de-skew patterns. Moreover, the hardware protocol engine is configured to send a de-skew pattern periodically according to the de-skew interval when the communication status information satisfies a criterion for performing the periodic de-skew pattern transmission, and to postpone sending of the de-skew pattern when the communication status information does not satisfy the criterion.

A storage device is provided according to an embodiment of the present invention. The storage device is operable to link to a host according to an interconnection protocol, and includes a storage module and a controller. The controller is coupled to the storage module and implements the interconnection protocol. The controller includes an interface circuit and a hardware protocol engine. The interface circuit implements a physical layer of the interconnection protocol to link to the host. The hardware protocol engine is coupled to the interface circuit and implements a link layer of the interconnection protocol. The hardware protocol engine is configured to perform a periodic de-skew pattern transmission adaptively over lanes from the storage device to the host according to a de-skew interval and in response to communication status information between the storage device and the host during a burst transmission. The de-skew interval indicates a time interval between two consecutive periodic de-skew patterns. Moreover, the hardware protocol engine is configured to send the de-skew pattern periodically according to the de-skew interval when the communication status information satisfies a criterion for performing the periodic de-skew pattern transmission, and to postpone sending of the de-skew pattern when the communication status information does not satisfy the criterion.

In some embodiments of the method for lane synchronization for an interconnection protocol, the controller, or the storage device above, the communication status information includes a burst transmission indication signal and frame busy information.

In some embodiments of the method for lane synchronization for an interconnection protocol, the controller, or the storage device above, the criterion includes that the burst transmission indication signal indicates the burst transmission being in progress, that a period according to the de-skew interval is reached, and that the frame busy information indicates no frame being transmitted.

In some embodiments of the method for lane synchronization for an interconnection protocol, the controller, or the storage device above, the hardware protocol engine is configured to send the de-skew pattern when determining that the burst transmission indication signal indicates the burst transmission being in progress, that the period according to the de-skew interval is reached, and that the frame busy information indicates no frame being transmitted.

In some embodiments of the method for lane synchronization for an interconnection protocol, the controller, or the storage device above, the hardware protocol engine is configured to postpone sending of the de-skew pattern when determining that the burst transmission indication signal indicates the burst transmission being in progress, that the period according to the de-skew interval is reached, and that the frame busy information indicates a frame being transmitted.

In some embodiments of the method for lane synchronization for an interconnection protocol, the controller, or the storage device above, the hardware protocol engine is configured, when determining that the burst transmission indication signal indicates the burst transmission being in progress, that the period according to the de-skew interval is reached, and that the frame busy information indicates that there is no longer frame being transmitted, to further check whether or not a time interval between a current time point and a time point at which a next period according to the de-skew interval is to be reached is greater than or equal to a minimum value.

In some embodiments of the method for lane synchronization for an interconnection protocol, the controller, or the storage device above, the hardware protocol engine is configured to send the de-skew pattern when the time interval is greater than or equal to the minimum value.

In some embodiments of the controller or the storage device above, the controller further includes a de-skew request circuit. The de-skew request circuit is disposed in the hardware protocol engine, and is for performing a periodic de-skew request transmission adaptively according to the de-skew interval and in response to communication status information between the first device and the second device during a burst transmission. The de-skew request circuit sends a de-skew request periodically according to the de-skew interval when determining that the communication status information satisfies the criterion, and the de-skew request circuit postpones sending of the de-skew request when determining that the communication status information does not satisfy the criterion. The hardware protocol engine is configured to send the de-skew pattern over the lanes from the first device to the second device in response to the de-skew request.

In some embodiments of the controller or the storage device above, the controller or the storage device is further configured to modify a value of the de-skew interval dynamically according to an indication signal for quality of service (QoS) of the link layer when the de-skew interval is greater than a minimum value that is allowable.

In some embodiments of the controller or the storage device above, the controller or the storage device is configured to perform multiple operations to modify the de-skew interval dynamically, the multiple operations including: in response to the indication signal to notify that a threshold value for error events has been reached, determining whether or not the value of the de-skew interval is greater than the minimum value that is allowable; and changing the value of the de-skew interval from a first value to a second value when the value of the de-skew interval is greater than the minimum value that is allowable, wherein the second value is less than the first value and is greater than or equal to the minimum value that is allowable.

In some embodiments of the method for lane synchronization for an interconnection protocol, the controller, or the storage device above, the interconnection protocol is a Universal Flash Storage (UFS) standard.

BRIEF DESCRIPTION OF THE DRAWINGS

FIG. 4A is a schematic timing diagram of adaptively utilizing periodic de-skew patterns according to an embodiment of the present invention.

FIG. 4B is a schematic timing diagram of adaptively utilizing periodic de-skew patterns according to an embodiment of the present invention.

FIG. 4C is a schematic timing diagram of adaptively utilizing periodic de-skew patterns according to an embodiment of the present invention.

FIG. 4D is a schematic timing diagram of adaptively utilizing periodic de-skew patterns according to an embodiment of the present invention.

DETAILED DESCRIPTION OF THE INVENTION

To facilitate understanding of the objectives, characteristics, and effects of this present disclosure, embodiments together with the attached drawings for the detailed description of the present disclosure are provided.

Multiple embodiments of the technique for lane synchronization for an interconnection protocol are provided below, and are suitable for a first device capable of linking to a second device according to the interconnection protocol. The technique is capable of adaptively utilizing periodic de-skew patterns in the interconnection protocol to promote lane synchronization during a communication process of the first device to the second device according to the interconnection protocol, thereby helping to reduce the occurrence of errors and improving transmission performance between a host and a device.

Figure 1A:
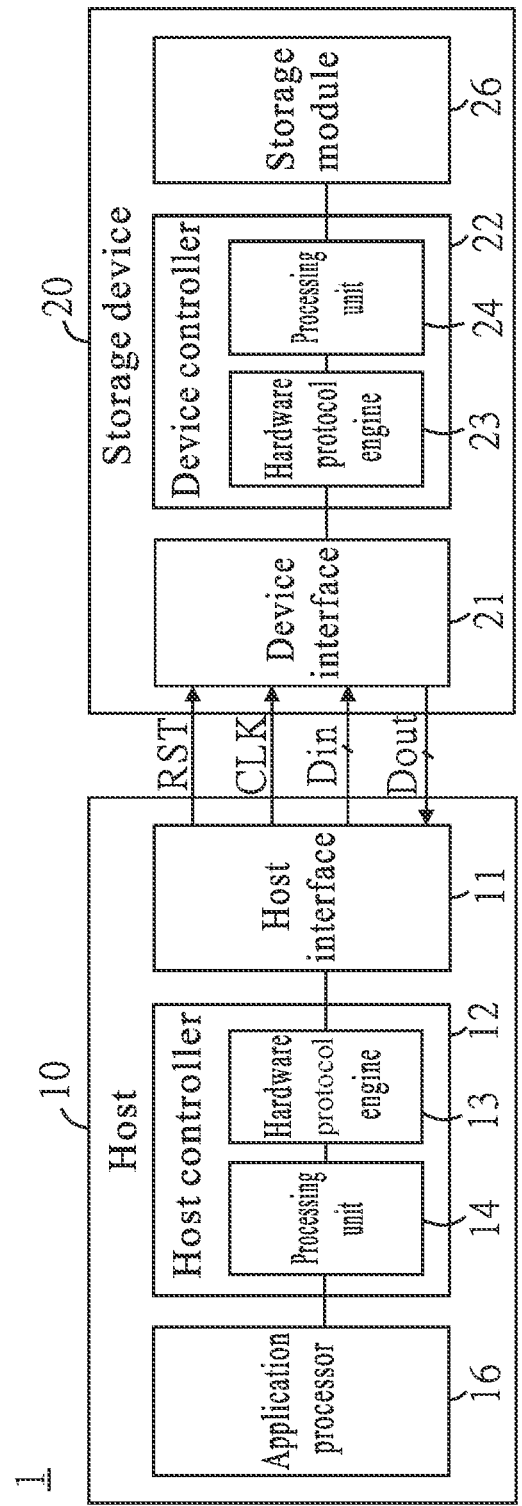
FIG. 1A is a diagram illustrating circuit architecture of a storage system according to an embodiment of the present invention.
Figure 1B:
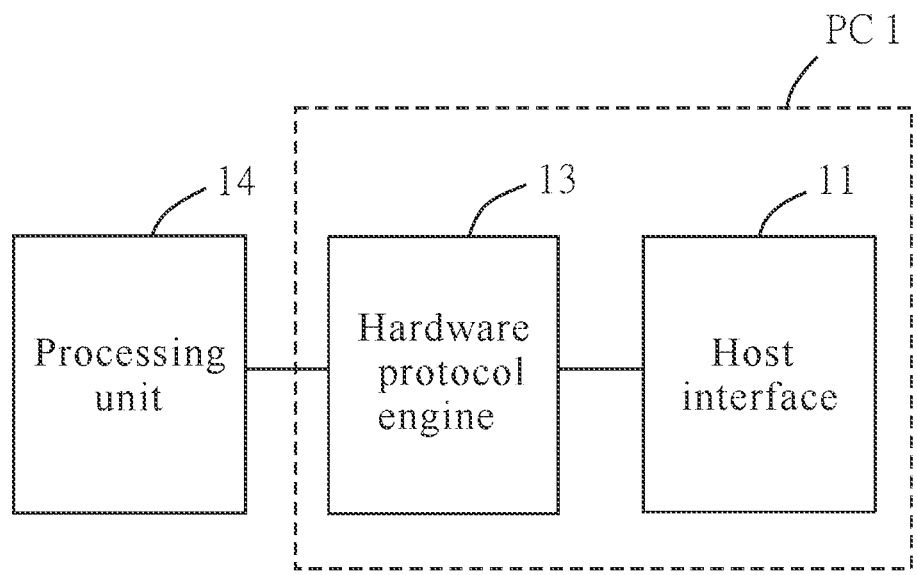
FIG. 1B is a block diagram applicable to the controller for an interconnection protocol in FIG. 1A according to an embodiment of the present invention.
Figure 1C:
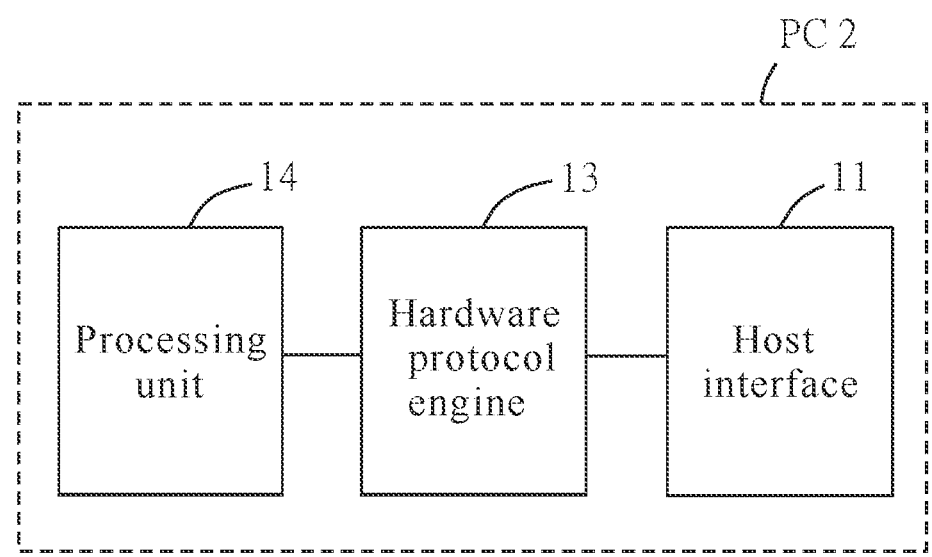
FIG. 1C is a block diagram applicable to the controller for an interconnection protocol in FIG. 1A according to an embodiment of the present invention.

To better understand and illustrate the various implementation approaches according to the technique, circuit architecture of an interconnection protocol-based communication system is first provided. Referring to FIG. 1A, a diagram of circuit architecture is shown according to an embodiment of the present invention. As shown in FIG. 1A, a storage system 1 includes a host 10 and a storage device 20. The host 10 and the storage device 20 communicate through an interconnection protocol in between, thereby allowing the host 10 to perform data access of the storage device 20. The interconnection protocol is, for example, the Universal Flash Storage (UFS) standard, or other suitable chip-to-chip communication protocols. According to the circuit architecture in FIG. 1A, the foregoing technique is applicable to a first device (for example, the storage device 20 in FIG. 1A) capable of linking to a second device (for example, the host 10 in FIG. 1A) according to the interconnection protocol, and is also suitable in an application scenario where the first device is the host 10 and the second device is the storage device 20. In the circuit architecture of FIG. 1A, a controller in the host 10 or the storage device 20 used to implement the interconnection protocol may be implemented by various means. As shown in FIG. 1A, the controller (for example, a host controller 12) in the host 10 used to implement the interconnection protocol or the controller (for example, a device controller 22) in the storage device 20 used to implement the interconnection protocol can be implemented as circuit architecture including a hardware protocol engine and a processing unit, wherein the processing unit of the controller is optional. In another example, as shown in FIG. 1B, the controller in the host 10 used to implement the interconnection protocol is referred to as, for example, a protocol controller PC1, which can be configured to include a host interface 11 and a hardware protocol engine 13 and be implemented as a single chip, wherein a processing unit 14 may be regarded as an external circuit of the protocol controller PC1. Moreover, similarly, the controller (or referred to as a protocol controller of the storage device 20) in the storage device 20 used to implement the interconnection protocol can be configured to include a device interface 21 and a hardware protocol engine 23 and be implemented as a single chip, wherein a processing unit 24 may be regarded as an external circuit of the protocol controller. For another example, as shown in FIG. 1C, the controller in the host 10 used to implement the interconnection protocol, for example, a protocol controller PC2, can be configured to include the host interface 11, the hardware protocol engine 13 and the processing unit 14, and be implemented as a single chip. Moreover, similarly, the controller (or referred to as a protocol controller of the storage device 20) in the storage device 20 used to implement the interconnection protocol can be configured to include the device interface 21, the hardware protocol engine 23, and the processing unit 24, and be implemented as a single chip. Thus, according to the circuit architecture in FIG. 1A, the controller in the host 10 or the storage device 20 used to implement the interconnection protocol can be regarded to cover or represent the embodiment based on FIG. 1A, FIG. 1B, or FIG. 1C. The description of other examples related to FIG. 1A is also suitable for the embodiments based on FIG. 1A, FIG. 1B, or FIG. 1C.

The circuit architecture shown in FIG. 1A has sufficient flexibilities and can be efficiently configured to meet requirements of different products, so as to adapt to diversified designs of manufacturers for better product development. The host 10 is, for example, a computing device such as a smartphone, a tablet computer, or a multimedia device. The storage device 20 is, for example, a storage device inside or outside the computing device, and is such as a storage device based on a non-volatile memory. The storage device 20 can be written with data under control of the host 10 or provide written data to the host 10. The storage device 20 can be implemented as a solid stage drive (SSD), a multimedia card (MMC), an embedded Multimedia card (eMMC), a Secure Digital (SD) card, or a UFS device; however, the implementation of the present disclosure is not limited to the examples above.

The host 10 includes the host interface 11, the host controller 12, and an application processor 16.

The host interface 11 implements a physical layer of the interconnection protocol so as to link to the storage device 20. For example, the host interface 11 implements a physical (M-PHY) layer of the UFS standard.

The host controller 12 is coupled between the host interface 11 and the application processor 16. When the application processor 16 needs to perform data access of the storage device 20, it sends a corresponding access operation command or write data to the host controller 12 and communicates with the storage device 20 through the interconnection protocol, thereby completing data access of the storage device 20.

The host controller 12 includes, for example, the hardware protocol engine 13 and the processing unit 14, wherein the processing unit 14 is optional.

The hardware protocol engine 13 implements a link layer of the interconnection protocol. Taking the UFS standard for example, the link layer is a Unified Protocol (UniPro) layer. The hardware protocol engine 13 communicates with the host interface 11 and the processing unit 14 and performs data conversion according to the specification of the link layer.

The processing unit 14 is coupled to the hardware protocol engine 13, and communicates with the application processor 16. The processing unit 14 can execute one or more sets of firmware. For example, an access operation command or write data sent by an operating system, a driver, or an application executed by the application processor 16 is converted into a command format compliant to the link layer of the interconnection protocol by the firmware executed by the processing unit 14, and is then sent to the hardware protocol engine 13 for processing according to specification of the link layer. Alternatively, read data returned by the storage device 20 in response to a read command of the host 10 is returned to the hardware protocol engine 13 according to the specification of the link layer of the interconnection protocol, and is converted by the corresponding firmware executed by the processing unit 14 into a format that is compliant to and can be read by the operating system, driver or application executed by the application processor 16. The firmware can be stored, for example, in an internal memory of the processing unit 14, or be stored in an internal memory of the host controller 12, wherein the internal memory can include a volatile memory and a non-volatile memory. The processing unit 14 is optional, that is, the task of the firmware above may be implemented at the hardware protocol engine 13 by means of hardware.

The storage device 20 includes the device interface 21, the device controller 22, and a storage module 26.

The device interface 21 implements a physical layer of the interconnection protocol to link to the host 10. For example, the device interface 21 is for implementing a physical (M-PHY) layer of the UFS standard.

The device controller 22 is coupled between the device interface 21 and the storage module 26. The device controller 22 fundamentally has functions corresponding to those of the host controller 12 described above. When the host 10 issues and sends an access operation command or write data to the storage device 10 through the interconnection protocol, the device controller 22 converts the received data into a corresponding access operation command or write data through the interconnection protocol so as to facilitate data access to be performed by the storage module 26. Alternatively, the device controller 22 returns, according to the specification of the link layer of the interconnection protocol, read data returned by the storage device 20 in response to the read command of the host 10 to the host 10. The storage module 26 includes, for example, a memory chip of one or more non-volatile memories, and is, for example, a flash memory chip. Herein, in one example, the storage device 20 may further be provided with a flash memory controller. The flash memory controller is coupled between the device controller 22 and the storage module 26, and can be configured to control write, read, or erase operations of the storage module 26, and is capable of data exchange with the storage module 26 through an address bus or a data bus.

In another example, the flash memory controller may be further provided in the device controller 22.

The device controller 22 includes, for example, the hardware protocol engine 23 and the processing unit 24, wherein the processing unit 24 is optional.

The hardware protocol engine 23 implements a link layer of the interconnection protocol. Taking the UFS standard as the interconnection protocol for example, the link layer is a UniPro layer. The hardware protocol engine 23 communicates with the device interface 21 and the processing unit 24 and performs data conversion according to the specification of the link layer.

The processing unit 24 is coupled to the hardware protocol engine 23, and communicates with the host 10 through the device interface 21. The processing unit 24 can execute one or more sets of firmware. For example, the processing unit 24 executes one or more sets of firmware to communicate with the above flash memory controller, so as to exchange data such as an access operation command, write data or read data between the interconnection protocol and the flash memory controller. The firmware can be stored, for example, in an internal memory of the processing unit 24, an internal memory of the device controller 22, or a predetermined storage region of the storage module 26, wherein the internal memory can include a volatile memory and a non-volatile memory.

As shown in FIG. 1A, the host interface 11 can be coupled to the device interface 21 through data lines Din and Dout for transmitting/receiving data, a reset line RST for transmitting a hardware reset signal, and a clock line CLK for transmitting data. The data lines Din and Dout can be implemented in multiple pairs, wherein one pair of data lines Din or one pair of data lines Dout can be referred to as a lane. The host interface 11 can communicate with the device interface 21 by using at least one interface protocol, which is, for example, the MIPI, UFS, Small Computer System Interface (SCSI), or Serial Attached SCSI (SAS); however, the implementation of the disclosure is not limited to the examples above. Under the UFS standard, the host 10 and the storage device 20 can be configured with multiple lanes in between to improve transmission efficiency, wherein either of the directions from the host 10 to the storage device 20 or from the storage device 20 to the host 10 can support two lanes at most, and the multiple lanes can be selectively set to be active or inactive.

Details are given by taking the UFS standard as an example of the interconnection protocol. The UFS standard includes a USF command set (USC) layer, a UFS transport (UTP) layer, and a UFS interconnect (UIC) layer. The UIC layer includes a link layer and a physical layer. The link layer of the UIC layer is defined according to the UniPro specification, and the physical layer of the UIC layer is defined according to the M-PHY specification.

Figure 2:
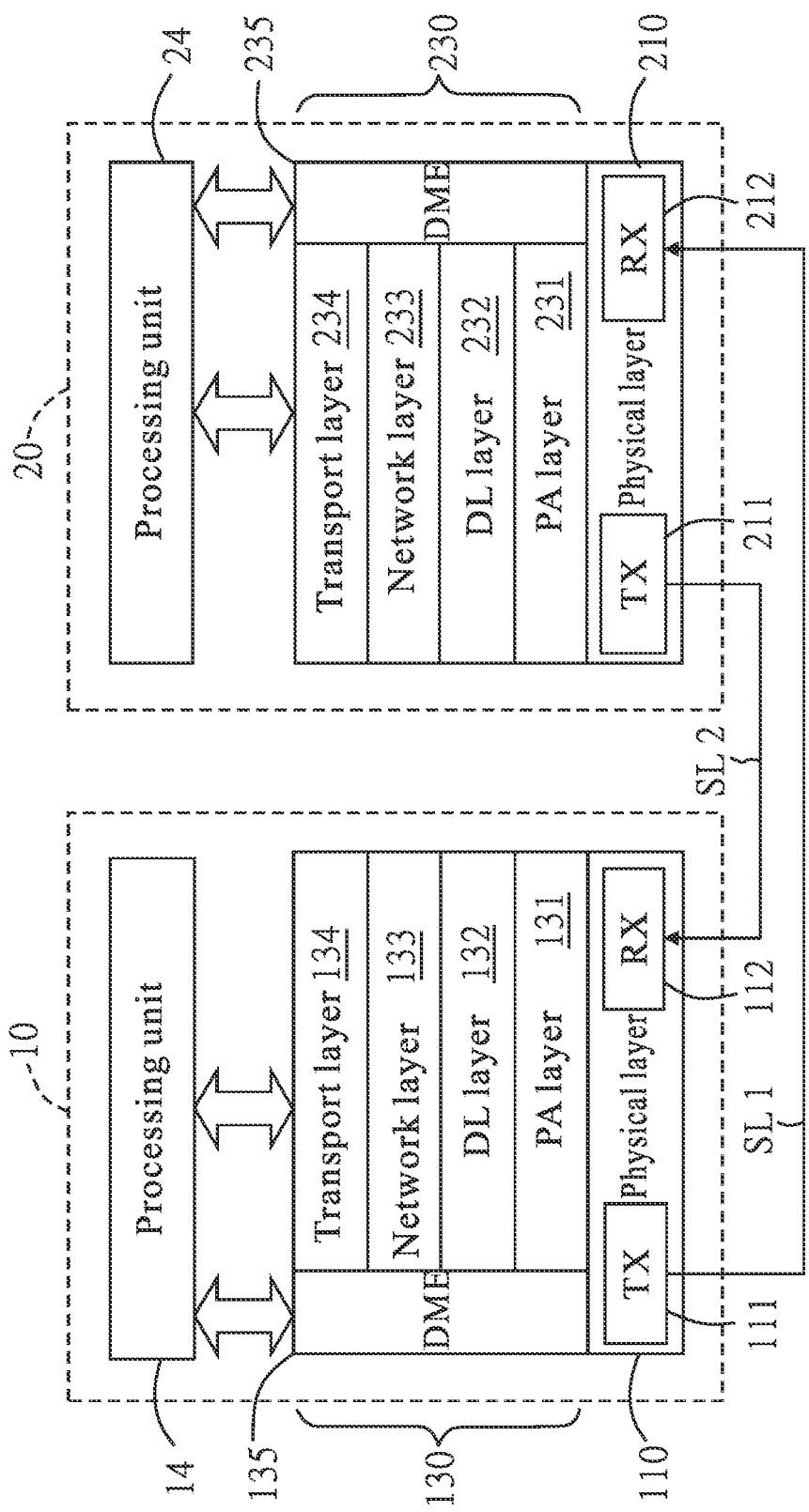
FIG. 2 is a schematic diagram of a layered structure of the storage system in FIG. 1A according to the UFS standard.

Referring to FIG. 2, a schematic diagram of layered architecture of the storage system in FIG. 1A is shown according to the UFS standard. Because the UFS standard is based on the MIPI UniPro layer and the MIPI M-PHY layer, the host interface 11 and the hardware protocol engine 13 of the host 10 shown in FIG. 1A are respectively used to implement a physical layer 110 and a UniPro layer 130 in FIG. 2. Also, the device interface 21 and the hardware protocol engine 23 of the storage device 20 in FIG. 1A are respectively used to implement a physical layer 210 and a UniPro layer 230 in FIG. 2.

As shown in FIG. 2, the UniPro layer 130 (or 230) can include a PHY adapter (PA) layer 131 (or 231), a data link (DL) layer 132 (or 232), a network layer 133 (or 233), and a transport layer 134 (or 234). The layers in the UniPro layer 230 of the storage device 20 can also similarly operate and be implemented.

The PHY adapter layer (131 or 231) couples the physical layer (110 or 210) to the data link layer (132 or 232). The PHY adapter layer (131 or 231) is capable of performing bandwidth control and power management between the physical layer (110 or 210) and the data link layer (132 or 232). In practice, the physical layer 110 of the host 10 includes a transmitter (TX) 111 and a receiver (RX) 112, and the physical layer 210 of the storage device 20 includes a transmitter (TX) 211 and a receiver (RX) 212, thereby establishing data lanes SL1 and SL2 to perform full duplex communication. The UniPro specification supports multiple data lanes for a link in each transmission direction (for example, forward or backward).

The data link layer (132 or 232) is capable of performing flow control of data transmission between the host 10 and the storage device 20. That is, the data link layer (132 or 232) can monitor data transmission or control a data transmission rate. Moreover, the data link layer (132 or 232) can perform cyclic redundancy check (CRC)-based error control. The data link layer (132 or 232) can use packets received from the network layer (133 or 233) to generate frames, or can use frames received from the PHY adapter layer (131 or 231) to generate packets.

The network layer (133 or 233) is used to select a router function for a transmission path for the packets received from the transport layer (134 or 234).

The transport layer (134 or 234) can use a command received from the UFS application layer to configure a data segment suitable for the protocol and transmit the data segment to the network layer (133 or 233), or can extract a command from packets received from the network layer (133 or 233) and transmit the command to the UFS application layer. The transport layer (134 or 234) can use a sequence-based error control scheme to ensure validity of data transmission.

Moreover, the UniPro layer (130 or 230) is further defined with a device management entity (DME) (135 or 235), which can communicate with the layers in the physical layer (110 or 210) and the UniPro layer (130 or 230), for example, the PHY adapter layer (131 or 231), the data link layer (132 or 232), the network layer (133 or 233), and the transport layer (134 or 234), so as to communicate with the UFS application layer, thereby implementing unified protocol (UniPro) overall functions such as control or configuration functions including power-on, power-off, reset, and power consumption mode change.

Taking the power consumption mode and burst transmission operation defined by UniPro in the physical adapter layer of the UniPro specification for example, the technical issues observed by the applicant of the present application in terms of lane synchronization in the interconnection protocol supporting multiple lanes are described below.

Table-1 below shows a mapping relationship between the UniPro power consumption mode and UniPro power consumption status defined in the UniPro specification and the M-PHY status defined by the M-PHY specification.

TABLE 1

| UniPro power consumption mode | UniPro power consumption status | M-PHY status |
| --- | --- | --- |
| Fast mode (Fast_Mode) Fast auto mode (FastAuto_Mode) | Fast state (FAST_STATE) | High-speed burst (HS-BURST) |
| Slow mode (Slow_Mode) Slow auto mode (SlowAuto_Mode) | Slow state (SLOW_STATE) | Pulse width modulation burst (PWM-BURST) |
| Fast auto mode (FastAuto_Mode) | Sleep state (SLEEP_STATE) | Stall (STALL) |
| Slow auto mode (SlowAuto_Mode) | | Sleep (SLEEP) |
| Hibernate mode (Hibernate_Mode) | Hibernate state (HIBERNATE_STATE) | Hibernate (HIBERN8) |
| Off mode (Off_Mode) | Off state (OFF_STATE) | Unpowered (UNPOWERED) |

In the UFS system, the physical adapter layer supports a UniPro power consumption mode capable of performing a burst transmission, for example, including "fast auto mode" (denoted as FastAuto_Mode) and "slow auto mode" (denoted as SlowAuto_Mode) that can be referred to as "auto modes", and "fast mode" (denoted as Fast_Mode) and "slow mode" (denoted as Slow_Mode) that can be referred as non-auto modes.

According to the UniPro specification, one M-PHY burst (or referred as a burst transmission) begins by sending a de-skew pattern, which is, for example, a control symbol defined by the M-PHY specification, denoted such as "<MK0, MK1>", wherein the control symbol MK0 functions as an identifier of a start of the M-PHY burst. The de-skew pattern is also used in lane re-synchronization. The de-skew pattern needs to be synchronously sent on all active lanes. Although the de-skew pattern can be sent at any time point, a PA layer transmitter (PA TX) needs to keep at least a predetermined distance between multiple de-skew patterns consecutively sent on each lane while a proximity rule is met, wherein the predetermined distance is, for example, a distance of 32 PHY adapter protocol data units (PA_PDU), which are equivalent to 64 symbol intervals (SI). A PA layer adapter receiver (PA RX) needs to be able to receive de-skew patterns at any time point.

In the fast auto mode (FastAuto_Mode), part of behaviors of a link are similar to behaviors in the fast mode (Fast_Mode), with however data sometimes arriving later. The reason for this is, latency is caused by transmitting the de-skew pattern <MK0, MK1> at the beginning of a data transfer so as to start a new burst in the process from the sleep state (SLEEP_STATE) to the fast state (FAST_STATE). The slow auto mode (SlowAuto_Mode) is an equivalent mechanism of the slow state (SLOW_STATE).

In continuation, the latency when a next burst transmission is started in a non-auto mode is shorter, for the reason that the burst transmission is already active and switching from the sleep state (SLEEP_STATE) to the fast state (FAST_STATE) is not required. However, the de-skew pattern (<MK0, MK1>) is sent only when a burst transmission begins. During the burst transmission, there are no other de-skew patterns except for cases of errors. In the case of errors, the UniPro specification requires that error recovery be performed. During the error recovery, the physical adapter layer is requested to perform lane synchronization, in which de-skew patterns are sent.

In the process where the burst transmission is performed in a non-auto mode, when de-skew patterns are sent for a period of time, a transmission error may be incurred due to skew between lanes caused by a shift or offset in a clock phase. Thus, the above error recovery may need to be performed for multiple times between the host and the storage device. As such, the transmission performance between the host and the storage device degrades further as the number of times error recovery is performed increases.

As described above, the applicant of the present application has observed the technical issues in terms of lane synchronization in the interconnection protocol (for example, the UFS standard). Regarding the above technical issues, a technique for lane synchronization for an interconnection protocol is provided. In the interconnection protocol, a mechanism capable of adaptive utilizing periodic de-skew patterns is further provided to promote lane synchronization. The technique is suitable for a first device capable of linking to a second device according to the interconnection protocol, wherein the first device and the second device may be a host and a storage device, respectively, or vice versa.

Figure 3A:
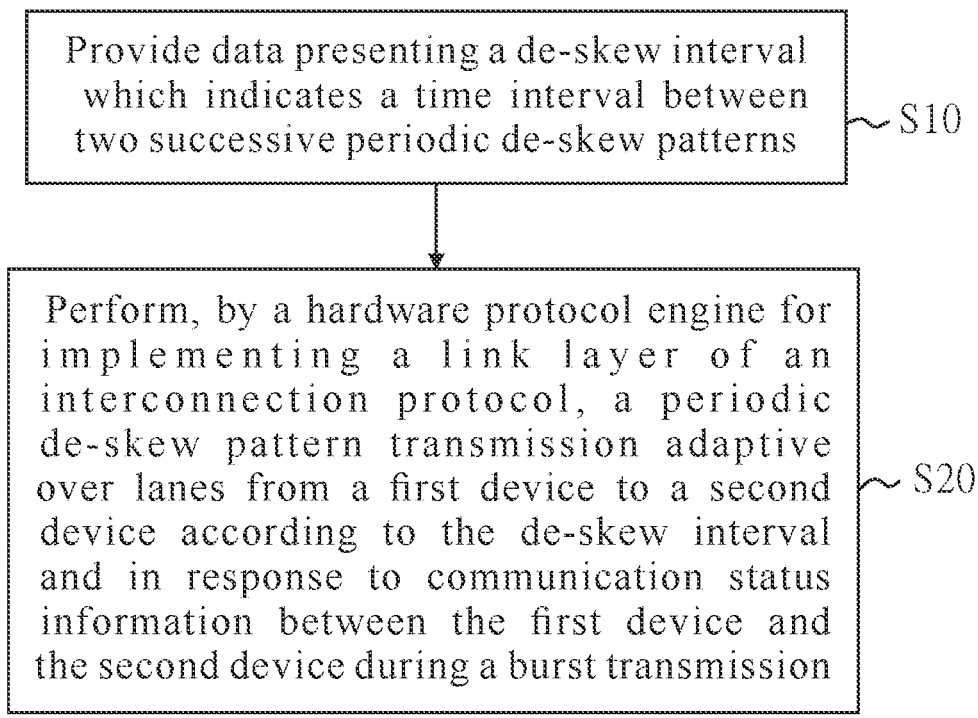
FIG. 3A is a flowchart of a method for lane synchronization for an interconnection protocol according to an embodiment of the present invention.

To implement the mechanism, referring to FIG. 3A, a flowchart of a method for lane synchronization for an interconnection protocol is shown according to an embodiment. The method is suitable for use in a first device capable of linking to a second device according to the interconnection protocol, and includes steps S10 and S20 below.

In step S10, data representing a de-skew interval is provided, wherein the de-skew interval indicates a time interval between two consecutive periodic de-skew patterns.

In step S20, by a hardware protocol engine for implementing a link layer of the interconnection protocol, a periodic de-skew pattern transmission is performed adaptively over lanes from the first device to the second device according to the de-skew interval and in response to communication status information between the first device and the second device during a burst transmission. Moreover, the hardware protocol engine is configured to send a de-skew pattern periodically according to the de-skew interval when the communication status information satisfies a criterion for performing the periodic de-skew pattern transmission, and to postpone sending of the de-skew pattern when the communication status information does not satisfy the criterion.

In the host or the storage device, the mechanism can be implemented in a circuit for implementing the interconnection protocol. Taking the UFS standard as the interconnection protocol for example, the mechanism is suitable in a circuit for implementing a physical adapter layer (for example, 131 or 231), for example, in a circuit of the controller (for example, the host controller 12 or the protocol controller (PC1 or PC2)) of the host 10 in FIG. 1A, or the controller (for example, the device controller 22 or the protocol controller) of the storage device 20.

Figure 3B:
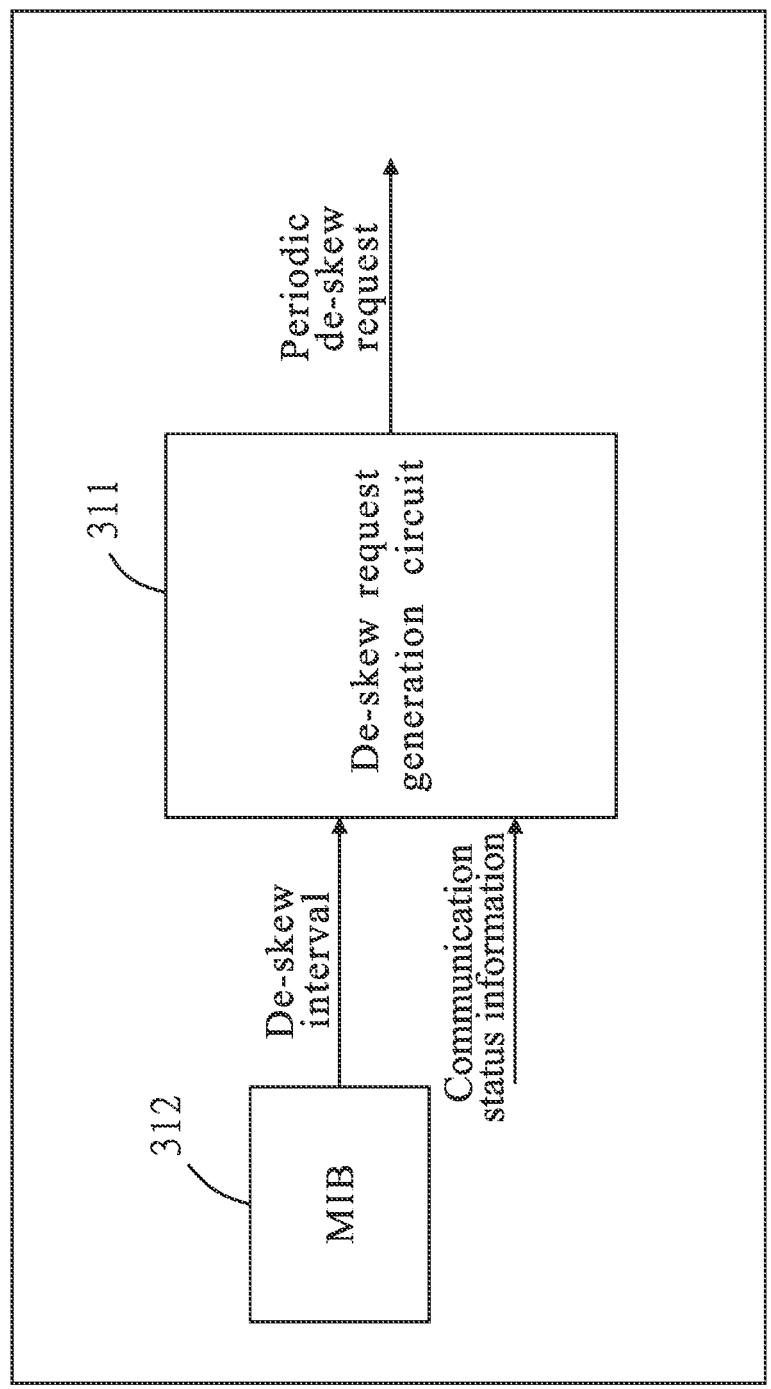
FIG. 3B is a diagram illustrating circuit architecture for implementing the method based on FIG. 3A according to an embodiment of the present invention.

Referring to FIG. 3B, circuit architecture for implementing the method based on FIG. 3A is illustrated according to an embodiment of the present invention. The circuit architecture is for implementing the above mechanism, and can be implemented in a hardware protocol engine (for example, the hardware protocol engine 13 of the host 10 or the hardware protocol engine 23 of the storage device 20). The hardware protocol engine is for implementing a link layer of the interconnection protocol (for example, the UniPro specification adopted by UFS; 130 or 230 in FIG. 2), and the hardware protocol engine is for communicating with an interface circuit (for example, 11 or 21 in FIG. 1A) for implementing a physical layer (for example, 110 or 210 in FIG. 2) of the interconnection protocol. Thus, in addition to being implemented according to the UniPro specification, the hardware protocol engine may further include a respective de-skew request generation circuit 311, thereby helping to achieve the above mechanism. Optionally, a management information base 312 may be implemented inside or outside of the hardware protocol engine.

The de-skew request generation circuit 311 is for performing a periodic de-skew pattern transmission adaptively according to the de-skew interval and in response to communication status information between the first device and the second device during a burst transmission. The de-skew request generation circuit 311 sends a de-skew request periodically according to the de-skew interval when it determines that the communication status information satisfies the criterion, and postpones sending of the de-skew request when it determines that the communication status information does not satisfy the criterion.

The management information base 312 is for storing a value of the de-skew interval, wherein the de-skew interval indicates a time interval between two consecutive periodic de-skew patterns.

The hardware protocol engine is further configured to correspondingly send the de-skew pattern over multiple lanes from the first device to the second device according to the interconnection protocol and in response to the de-skew request sent by the de-skew request generation circuit 311. For example, according to the interconnection protocol such as the UFS standard, a circuit for implementing a link layer according to the UniPro specification needs to send a corresponding de-skew pattern in response to a de-skew request. For example, in the UniPro specification, a de-skew request needs to be generated when a burst transmission begins so as to send the de-skew pattern. For another example, a primitive PA_LANE_ALIGN.req may be regarded as a de-skew request, and a data link layer may generate this request to prompt the physical adapter layer to perform lane synchronization, accordingly sending the de-skew pattern in the physical adapter layer. Compared to the de-skew request that needs to be generated according to the UniPro specification above, the de-skew request sent by the de-skew request generation circuit 311 is generated in a periodic de-skew pattern transmission performed adaptively according to the de-skew interval and in response to communication status information during a burst transmission.

In some embodiments, communication status information detected by the de-skew request generation circuit 311 includes, for example, a burst transmission indication signal and frame busy information.

In some embodiments, the criterion adopted by the de-skew request generation circuit 311 includes, for example, that the burst transmission indication signal indicates the burst transmission being in progress, that a period according to the de-skew interval is reached, and that the frame busy information indicates no frame being transmitted.

In some embodiments, the de-skew request generation circuit 311 is configured to send the de-skew request when it is determined that the burst transmission indication signal indicates the burst transmission being in progress, that the period according to the de-skew interval is reached, and that the frame busy information indicates no frame being transmitted.

In some embodiments, the de-skew request generation circuit 311 is configured to postpone sending of the de-skew request when it is determined that the burst transmission indication signal indicates the burst transmission being in progress, that the period according to the de-skew interval is reached, and that the frame busy information indicates a frame being transmitted.

In some embodiments, the de-skew request generation circuit 311 is configured, when it is determined that the burst transmission indication signal indicates the burst transmission being in progress, that the period according to the de-skew interval is reached, and that the frame busy information indicates that there is no longer frame being transmitted, to further check whether or not a time interval between a current time point and a time point at which a next period according to the de-skew interval is to be reached is greater than or equal to a minimum value to determine whether or not to send the de-skew request. In some embodiments, the de-skew request generation circuit 311 is configured to, if the time interval is greater than or equal to the minimum value, send the de-skew request.

In some embodiments, a circuit for implementing a physical adapter layer is configured to further adaptive utilize periodic de-skew patterns in the interconnection protocol to promote lane synchronization to help to reduce the occurrence of errors, thereby improving transmission performance between a host and a device.

Taking the UFS standard as the interconnection protocol as an example, multiple embodiments implementing the mechanism are provided below.

Figure 3C:
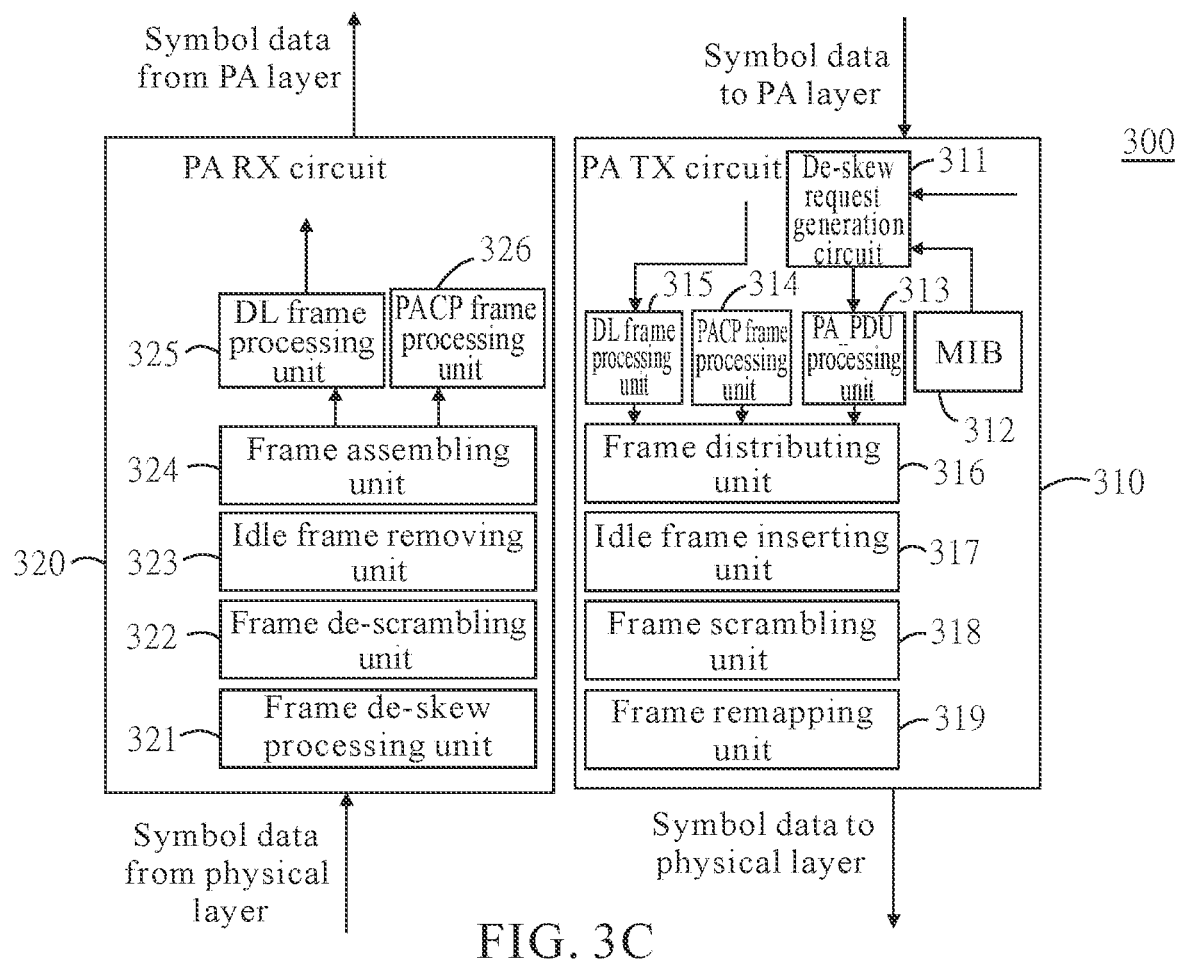
FIG. 3C is a diagram illustrating circuit architecture of a circuit for implementing a physical adapter layer according to an embodiment of the present invention.

Referring to FIG. 3C, circuit architecture of a circuit for implementing a physical adapter layer is illustrated according to an embodiment. Multiple examples can be derived on the basis of FIG. 3C. The circuit architecture shown in FIG. 3C is applicable to a hardware protocol engine (for example, 13 in FIG. 1A, FIG. 1B or FIG. 1C) implemented in a host or a hardware protocol engine (for example, 23 in FIG. 1A) implemented in a storage device, for example, used to implement a physical adapter layer (for example, 131 or 231 in FIG. 2) in a hardware protocol engine of a host and a storage device.

As shown in FIG. 3C, a physical adapter layer circuit 300 includes a physical adapter layer transmitter (PA TX) circuit 310 and a physical adapter layer receiver (PA RX) circuit 320. To provide a mechanism that adaptive utilizes periodic de-skew patterns to promote lane synchronization, the PA TX circuit 310 of this embodiment includes a de-skew request generation circuit 311 for triggering a request for sending a de-skew pattern. Moreover, in the PA TX circuit 310, the predetermined management information base (MIB) 312 is used to store data (for example, values) of the foregoing "de-skew interval" for the de-skew request generation circuit 311 to read and use.

The management information base 312 is a circuit implemented by, for example, various appropriate memories such as a volatile memory, a non-volatile memory, or a register. Optionally, in one example, a controller (for example, 12 or 22), a protocol controller, or other circuits of the host 10 (or the storage device 20) may be configured to set values of the de-skew interval in the management information base 312, or these values may be set by firmware. Optionally, the storage of the values of the de-skew interval may also be implemented outside the physical adapter layer circuit 300.

The PA TX circuit 310 is for distributing symbol data from a data link layer (for example, 132 or 232 in FIG. 2) to multiple active lanes, processing the symbols according to the UniPro specifications, and further sending the processed symbols to a physical layer (for example, 110 or 210 in FIG. 2). As shown in FIG. 3C, the PA TX circuit 310 includes circuits associated with a PA TX circuit implemented based on the UniPro specification, for example, a physical adapter layer protocol data unit (PA_PDU) processing unit 313, a physical layer control protocol (PACP) frame processing unit 314, a DL frame processing unit 315, a frame distributing unit 316, an idle frame inserting unit 317, a frame scrambling unit 318, and a frame remapping unit 319. The multiple units above are implemented according to operations of a PA TX according corresponding to the UniPro specification. In addition to generating physical adapter layer protocol data units (PA_PDU) according to operations of a physical layer corresponding to the UniPro specification, in order to implement the method based on FIG. 3A and the circuit architecture of FIG. 3C, the PA_PDU processing unit 313 is further configured to correspondingly generate PA_PDUs according to the control symbols "<MK0, MK1>" in response to the de-skew request generated by the de-skew request generation circuit 311, thereby generating a de-skew pattern.

The PA RX circuit 320 is for combining symbol data from multiple active lanes of a physical layer (for example, 110 or 210 in FIG. 2), processing the symbols according to the UniPro specification, and sending the processed symbols to a data link layer (for example, 132 or 232 in FIG. 2). As shown in FIG. 3C, the PA RX circuit 320 includes circuits associated with a PA RX circuit implemented based on the UniPro specification, for example, a frame de-skew processing unit 321, a frame de-scrambling unit 322, an idle frame removing unit 323, a frame assembling unit 324, a DL frame processing unit 325, and a PACP frame processing unit 326. The multiple units above are implemented according to operations of a PA RX corresponding to the UniPro specification.

The embodiment of the circuit architecture of a physical adapter layer based on FIG. 3C is capable of implementing the mechanism adaptively utilizing periodic de-skew patterns in the interconnection protocol so as to promote lane synchronization. Significances represented by value ranges and values of the "de-skew interval" are further defined under the UniPro specification with examples below. As illustrated in Table-2, a parameter of a time interval is defined, which is referred to as a de-skew interval.

TABLE 2

| Attribute | PA_Vendor_DeSkew_Interval (with a significance being "de-skew interval" specific to physical layer vendors) |
|---|---|
| Attribute identifier (Attribute_ID) | Vendor MIB (vendor specific MIB, with actual values of ID being appropriately set according to the UniPro specification) |
| Description | In a non-auto mode, the time interval of two consecutive periodic de-skew patterns; The time interval is defined by sending the de-skew patterns <MK0, MK1>: 0: default value, indicating that the function of sending the de-skew pattern is disabled; 1 to 65535: sending the de-skew pattern according to the value Notes: In the fast mode, the minimum value of PA_Vendor_DeSkew_Interval is 1; in the slow mode, the minimum value of PA_Vendor_DeSkew_Interval is 256. |
| Type | 16-bit word |
| Unit | microsecond (μs) |
| Valid attribute value | 0 to 65535 |
| Reset value | 0 |

As shown in Table-2, in an example based on the UniPro specification, an attribute of the management information base can be added to represent the "de-skew pattern". More specifically, the foregoing "de-skew pattern" may be further defined and categorized as an attribute in the vendor specific management information base of a physical adapter layer in the UniPro specification. Thus, as shown in FIG. 2, according to the description of attributes of the UniPro specification, the "de-skew pattern" is further defined in this example, including the attribute name, attribute identifier, description, type, unit, valid attribute value, and reset value.

In the example in Table-2, the value of the "de-skew interval" is an integer. When the value of the "de-skew interval" (PA_Vendor_DeSkew_Interval1) is zero, it means that the mechanism adaptively utilizing periodic de-skew patterns is disabled. When the value of the "de-skew interval" is other non-zero values, it means that the circuit architecture of a physical adapter layer based on FIG. 3C can be used to adaptively send periodic de-skew patterns according to the value of the de-skew interval so as to promote lane synchronization. For example, when the value of the "de-skew interval" is set to the minimum non-zero value 1 (μs), the mechanism adaptively utilizing periodic de-skew patterns can be enabled. This 1 μs interval satisfies the foregoing proximity rule, that is, a distance of at least 32 PA_PDUs is kept between two consecutive periodic de-skew patterns sent on each lane.

In a DL_CreditUnit32 mode of the UniPro specification, a maximum transfer unit (MTU) is 274 bytes. For example, 16 outstanding frames occupy 16*274*8*(10/8)*0.801 ns (HSG1-A)=35.115 μs. In a DL_CreditUnit128 mode of the UniPro specification (UniPro 2.0), the MTU of a transport layer is 1144 bytes. For example, 16 outstanding frames occupy 16*1144*8*(10/8)*0.801 ns (HSG1-A)=146.615 μs. It is seen from the calculation above, the value range (1 μs to 65535 μs) of the "de-skew interval" should be effective, and an appropriate value can be set for the de-skew interval to perform the periodic de-skew pattern transmission without frequently disturbing frames of a data link layer.

Moreover, in order to have the distance between two neighboring de-skew patterns in the same lane satisfy the proximity rule, as shown in Table-2, in the fast mode, the minimum value of PA_Vendor_DeSkew_Interval is 1; in the slow mode, the minimum value of PA_Vendor_DeSkew_Interval is 256. This minimum value may be regarded as a period threshold value of the de-skew interval.

Thus, when implementing the foregoing technique and mechanism, the "de-skew interval" can be defined by using the adopted interconnection protocol (for example, UFS or other similar protocols) and be accordingly implemented. Therefore, the implementation of the present disclosure is not limited to the examples above.

As described above, in terms of adaptively performing of a periodic de-skew request transmission, for example, the PA TX circuit 310 or the de-skew request generation circuit 311 may be configured to detect information (for example, including one or more signals (or parameters)) indicating the communication status between the first device and the second device, to send the de-skew request when the PA TX circuit 310 or the de-skew request generation circuit 311 determines that the information satisfies a criterion for allowing sending of the de-skew request, to postpone a timing for sending the de-skew request or to cancel a particular de-skew request when the PA TX circuit 310 or the de-skew request generation circuit 311 determines that the communication status information does not satisfy the criterion. How to adaptively send periodic de-skew patterns and timings for sending de-skew patterns are further described by taking the UniPro specification as an example below. Moreover, in the example below, information of "communication status" that needs to be detected by the de-skew request generation circuit 311 and the "criterion" are further described in detail.

For example, according to the UniPro specification, the de-skew pattern needs to be sent in the events below: the de-skew pattern is sent once when a burst transmission begins in a non-auto mode; the de-skew pattern is sent when error recovery is performed. According to some embodiments of the present disclosure, a periodic de-skew transmission is performed further based on the foregoing "de-skew interval" (PA_Vendor_DeSkew_Interval), so as to perform compensation when there is no de-skew pattern during a burst transmission and to prevent of occurrence of errors. Accordingly, during the burst transmission, there are scenarios of multiple of embodiments as shown by the timing diagrams in FIG. 4A to FIG. 4D when a periodic de-skew transmission is performed based on the foregoing "de-skew interval".

The embodiment in FIG. 4A is scenario 1, which is a common situation of sending the periodic de-skew pattern. A physical adapter layer can be implemented to set a TX_Burst signal to be asserted (for example, at a timing point T1) to indicate that the TX_Symbol signal is about to start a burst transmission, and to send the periodic de-skew pattern (for example, <MK0, MK1>) (for example, represented by DW in the drawing) at each de-skew interval (PA_Vendor_DeSkew_Interval) after the start of the burst transmission, for example, at time points T1, and T2 to T5, until the burst transmission is turned off when the TX_Burst signal is set to be de-asserted because of the MK2 control symbol (for example, represented by DWE) defined by the M-PHY specification. The scenario 1 causes a local device (for example, a host) and a peer device (for example, a storage device) to perform lane synchronization by using the periodic de-skew pattern as a guide signal. Because there is no frame being transmitted each time a period according to the de-skew interval is reached, for example, at the time points T1 and T2 to T5, for example, there is no transmission of PACP frames (as indicated by FP) or DL frames (as indicated by FD), when the TX_Burst signal is effective, the de-skew pattern (for example, <MK0, MK1>) (represented by DW in the drawing) is sent periodically.

The embodiment in FIG. 4B is scenario 2, which is an example between a periodic de-skew pattern and a PACP frame or a DL frame. When the time point for sending the periodic de-skew pattern is reached, for example, if the PACP frame is being transmitted at the time point T2, or if the DL frame is being transmitted at the time point T4, a physical adapter layer can be implemented to postpone sending of the de-skew pattern until sending of the PACP frame (for example, at the time point T2) or the DL frame (for example, at the time point T4) is completed. At the time point T3, there is no frame to be transmitted, and so the de-skew pattern is sent. Moreover, the time interval between two successive periodic de-patterns should be more than an interval of 64 symbols (SI), for example, the time interval (for example, TL1 or TL2 shown in FIG. 4B) between the de-skew pattern at the time point T3 (or T5) and the previous de-skew pattern which the de-skew pattern at the time point T3 (or T5) follows.

The embodiment shown in FIG. 4C is scenario 3, which shows an example of a PACP frame and a DL frame that are back-to-back at the time points T2 and T3 (following a UniPro suspend/resume solution). At the time point T2, the PACP frame and the DL frame are being transmitted, and a physical adapter layer can be implemented to postpone sending of the de-skew pattern until sending of the PACP frame and the DL frame is completed. At the time point T3, there is no frame being transmitted, and so the de-skew pattern is sent. Moreover, the time interval between two successive de-patterns should be more than an interval of 64 symbols (SI), for example, the time interval (for example, TL3 shown in FIG. 4C) between the de-skew pattern at the time point T3 and the previous de-skew pattern which the de-skew pattern at the time point T3 follows.

The embodiment shown in FIG. 4D is scenario 4, which shows another example of a PACP frame and a DL frame that are back-to-back at the time points T2 and T3 (following a UniPro suspend/resume solution). Compared to FIG. 4C in which there is a sufficient time interval after the PACP frame at the time point T2 and the following DL frame to the time point T3 for sending the de-skew pattern, the PACP frame at the time point T2 and the following DL frame occupy more time, such that the remaining time interval (for example, TL4 shown in FIG. 4D) after that to the time point T3 is less than 64 SI, and hence there is no sufficient time for transmitting the de-skew pattern originally scheduled to be sent at the time point T2. Thus, the physical adapter layer can be implemented to send the de-skew pattern at the time point T3, instead of sending the de-skew pattern originally scheduled to be sent at the time point T2, or canceling the de-skew pattern.

Moreover, during error recovery (for example, in a link re-initialization by a primitive PA_INIT of the UniPro specification, or a power consumption mode change request by a frame PACP_PWR_req or a power consumption mode change confirmation by a frame PACP_PWR_cnf), a reference M-PHY module interface (RMMI) burst is turned off, and a new burst is to be sent next time. When the burst is turned off, the periodic de-skew pattern is disabled, or the periodic de-skew pattern is postponed, until the transmission of the PACP frame is completed. Moreover, the time interval between the two consecutive de-skew patterns should be more than 64 symbol intervals (SI).

In some embodiments, the PA TX circuit 310 of the de-skew request generation circuit 311 in FIG. 3C can be configured to adaptively utilize the periodic de-skew patterns, thereby implementing the scenarios in the multiple embodiments shown by the timing diagrams in FIG. 4A to FIG. 4D.

Figure 5:
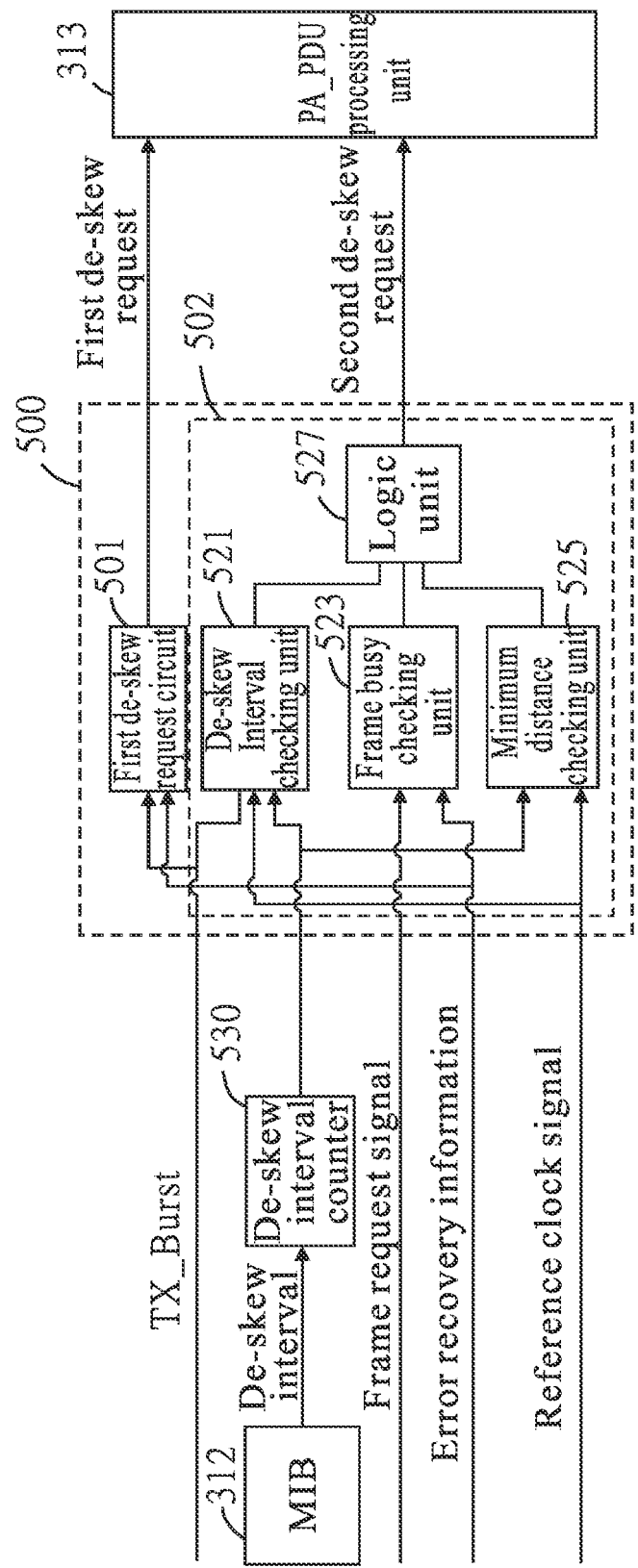
FIG. 5 is a block diagram of a de-skew request generation circuit in FIG. 3C according to an embodiment of the present invention.

Referring to FIG. 5, a block diagram of a de-skew request generation circuit in FIG. 3C is shown according to an embodiment of the present invention. As shown in FIG. 5, a de-skew request generation circuit 500 includes a first de-skew request circuit 501 and a second de-skew request circuit 502. The first de-skew request 501 is for sending the de-skew request according to an interconnection protocol (for example, a link layer of the UFS standard, that is, the UniPro specification) when a burst transmission begins or in the case of error recovery, wherein the de-skew request is denoted as a first de-skew request in FIG. 5, thereby triggering sending of the de-skew pattern. The second de-skew request 502 is configured to adaptively send a de-skew request for periodic de-skew patterns, wherein the de-skew request is denoted as a second de-skew request, thereby triggering sending of the de-skew pattern. In practice, a signal output by the de-skew request generation circuit 500 is implemented as, for example, a de-skew request signal, which is asserted or has a pulse wave to represent the de-skew request.

As shown in FIG. 5, the PA_PDU processing unit 313 receives the de-skew request sent by the de-skew request generation circuit 500. For the PA_PDU processing unit 313, the first de-skew request or the second de-skew request sent by the de-skew request generation circuit 500 is the pulse wave in the de-skew request signal output by the de-skew request generation circuit 500. The PA_PDU processing unit 313 is for inserting the de-skew pattern in response to the de-skew request, for example, inserting a physical adapter layer protocol data unit (PA_PDU) of the de-skew pattern (<MK0, MK1>), and providing an output to the frame distributing unit 316 for further processing according to the UniPro specification.

In FIG. 5, the de-skew request generation circuit 500 detects information (for example, including one or more related signals (or parameters)) indicating the communication status between the first device and the second device, and determines whether or not the communication status information satisfies a criterion for sending the de-skew request, thereby adaptively sending the de-skew request.

For example, the first de-skew request circuit 501 detects the TX_Burst signal and information related to conditions of the error recovery to determine to send the first de-skew request when the burst transmission begins or in the case of error recovery.

For example, the second de-skew request circuit 502 detects the TX_Burst signal, information related to frame busy and information related to conditions of the error recovery, and adaptively sends the de-skew request for the periodic de-skew pattern according to the foregoing "de-skew interval" and reference clock signal during the burst transmission. The information of frame busy includes, for example, a request signal (for example, a frame or a corresponding signal sent by a primitive of the UniPro specification) including a DL frame or a PACP frame, and indicates the case of frame busy when the frame request signal is present. The information of conditions of the error recovery is, for example, related signals or information when error recovery is performed. For example, when the physical adapter layer is requested to perform lane synchronization by a primitive PA_LANE_ALIGN.req of the UniPro specification, a power consumption mode change request performed by a frame PACP_PWR_req, or a power consumption mode change confirmation performed by a frame PACP_PWR_cnf indicates the occurrence of the case of error recovery. In an embodiment, the second de-skew request circuit 502 can include a de-skew interval checking unit 521, a frame busy checking unit 523, a minimum distance checking unit 525, and a logic unit 527. The units (for example, 521, 523 and 525) determine, according to the corresponding communication status information (for example, including one or more signals (or parameters), or a corresponding primitive or a corresponding signal in the UniPro specification), whether or not the communication status information satisfies the criterion so as to output a corresponding check result signal.

Figure 6:
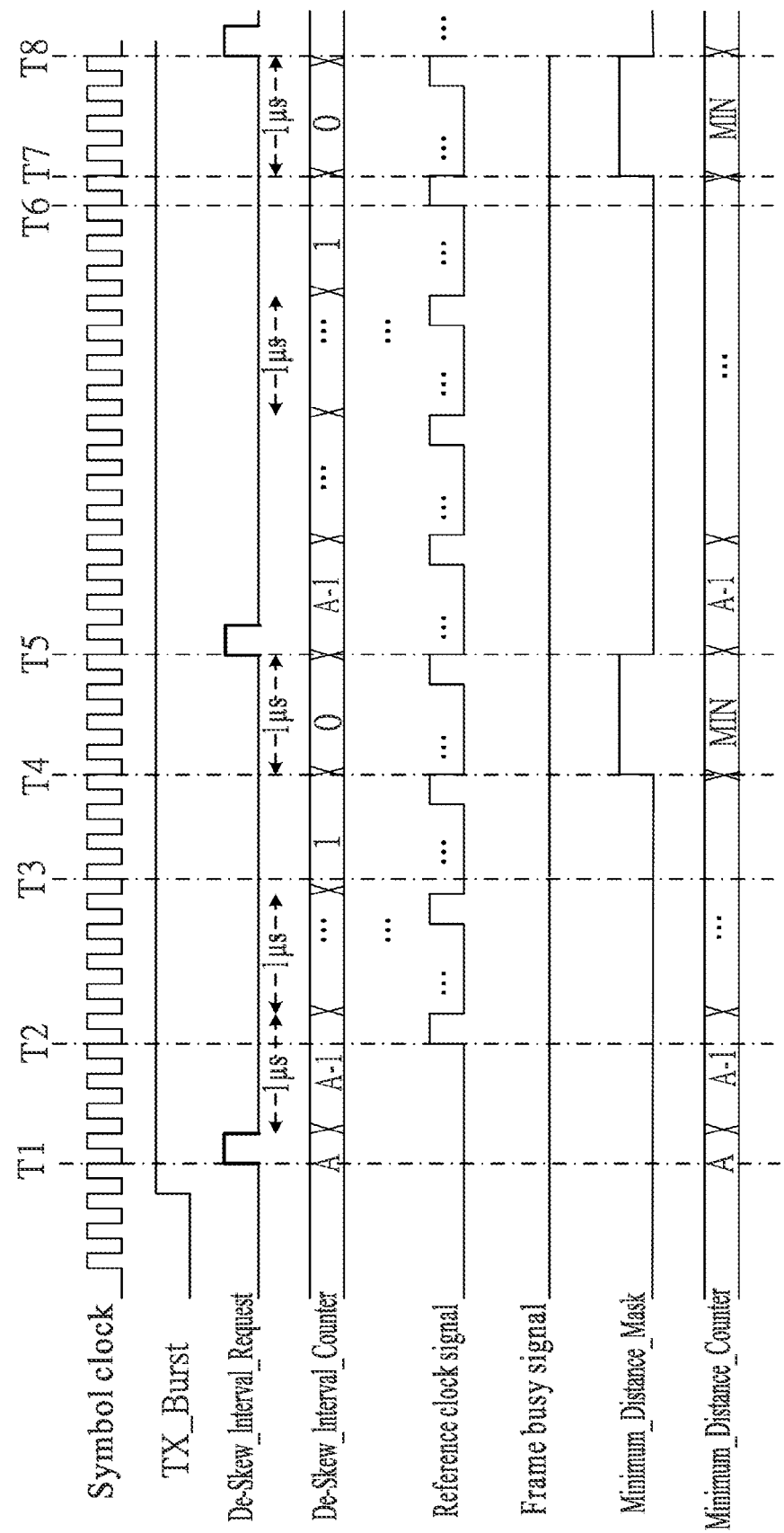
FIG. 6 is a schematic timing diagram of periodic de-skew patterns adaptively sent by the circuit in FIG. 5 according to an embodiment of the present invention.
Figure 7:
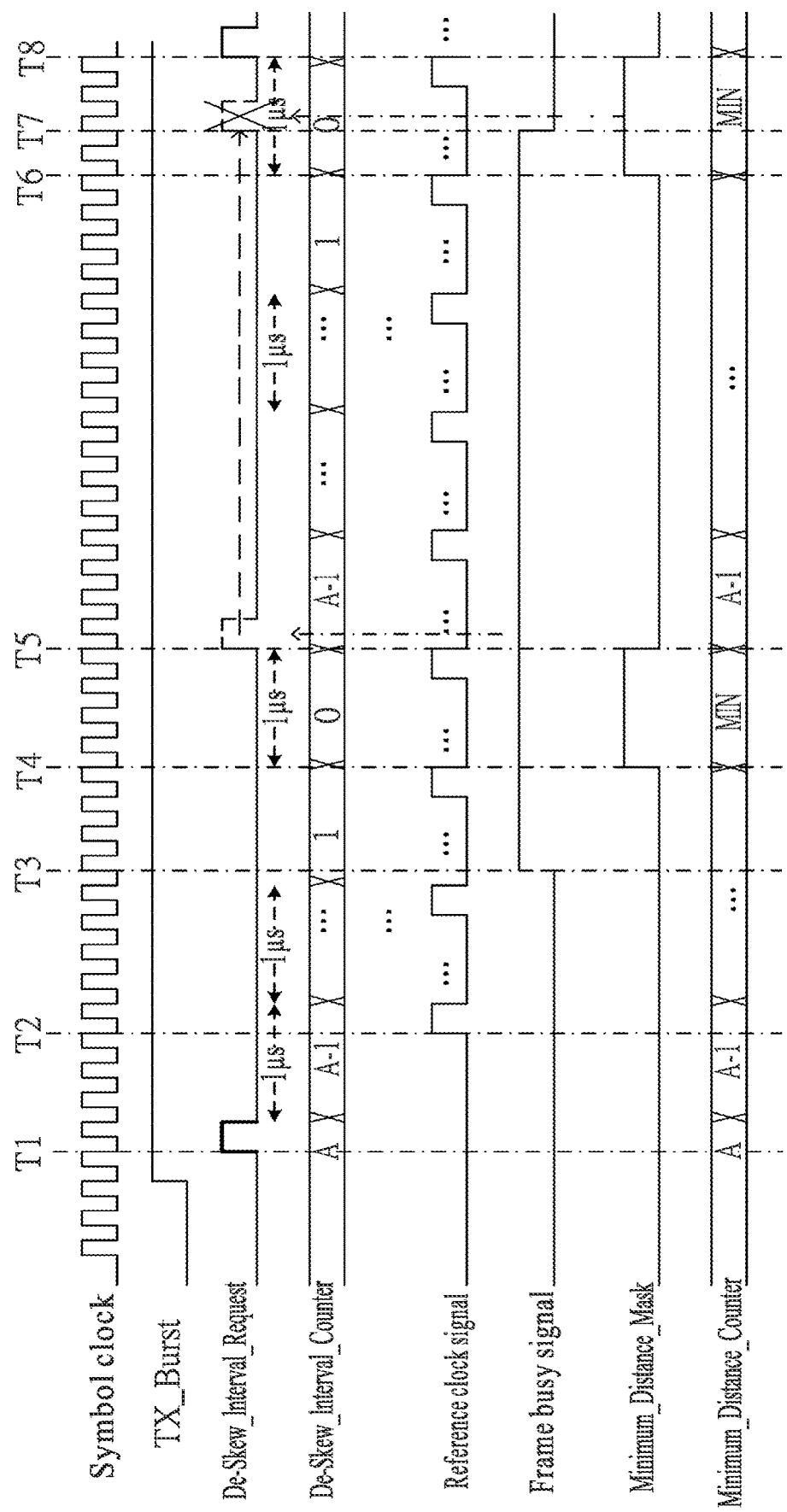
FIG. 7 is a schematic timing diagram of periodic de-skew patterns adaptively sent by the circuit in FIG. 5 according to an embodiment of the present invention.

The de-skew interval checking unit 521 is for outputting a first check result signal according to criterion 1. The criterion 1 may be described as: a burst transmission indication signal is asserted (for example, the TX_Burst signal=1'b1 (represented in the Verilog language) of RMMI in the UniPro specification, and when a period of the "de-skew interval" as the basis of the periodic de-skew pattern is reached. When the criterion 1 is satisfied, the first check result signal is set to be asserted, otherwise the first check result signal is set to be de-asserted. Moreover, the de-skew interval checking unit 521 needs to obtain the "de-skew interval", and this may be implemented by various approaches. For example, a de-skew interval counter 530 may be provided to read the value or data of the de-skew interval from the management information base 312 and accordingly output a de-skew interval counter signal. The de-skew interval checking unit 521 receives the de-skew interval counter signal and a reference signal, and accordingly determines whether or not the time of the period of the period de-skew pattern according to the "de-skew interval"

is reached. The de-skew interval counter signal is, for example, a signal representing counting down from a value based on the de-skew interval to zero (for example, the value of the de-skew interval is A, and counts down from A-1, A-2, . . . , 1 and 0). The reference signal is, for example, a pulse wave having a period of one unit time (for example, 1 μs). In another example, the de-skew interval checking unit 521 may also be implemented as, when the de-skew interval counter signal indicates that counting down to 0 has ended and is about to start count-down from A-1 while the burst transmission indication signal is asserted, setting the first check result signal to be asserted, for example, sending a pulse wave, to indicate that the time of the period using the "de-skew interval" has been reached; otherwise, setting the first check result signal to be de-asserted. For illustration purposes, the first check result signal may be referred to as a de-skew interval request signal (denoted as De-Skew_Interval_Request), as shown in FIG. 6 or FIG. 7.

The frame busy checking unit 523 is for outputting a second check result signal according to criterion 2. The criterion 2 may be described as: setting the second check result signal to be asserted when there is no other frame such as the PACP frame or DL frame being transmitted; and postponing transmission of the de-skew pattern when the PACP frame or DL frame is being transmitted. The above PACP frame or DL frame may be sent in normal circumstances, or caused by the case of error recovery. When the criterion 2 is satisfied, the second check result signal is set to be asserted; otherwise the second check result signal is set to be de-asserted to thereby represent the state of frame busy. In another example, the frame busy checking unit 523 may also be implemented as setting the second check result signal to be asserted when the PACP frame or DL frame is being transmitted, otherwise setting the second check result signal to be de-asserted. For illustration purposes, the second check result signal may be referred to as a frame busy signal for indicating whether the PACP frame or DL frame is being transmitted, as shown in FIG. 6 or FIG. 7.

The minimum distance checking unit 525 is for outputting a third check result signal according to criterion 3. The criterion 3 may be described as: a minimum distance of at least 32 PA_PDUs (64 symbol intervals (SI)) is required between successive de-skew patterns transmitted on each lane. When the criterion 3 is satisfied, the third check result signal is set to be asserted; otherwise the third check result signal is set to be de-asserted. In another example, the minimum distance checking unit 525 may also be implemented as setting the third check result signal to be asserted during period of the time interval of the last minimum distance (for example, 32 PA_PDUs) in each period according to the "de-skew interval", otherwise setting the third check result signal to be de-asserted. Herein, the third check result signal may also be referred to as a minimum distance mask signal (denoted as Minimum_Distance_Mask), as shown in FIG. 6 or FIG. 7.

In this embodiment, the minimum distance time of the fast mode (Fast_Mode) (or corresponding to the high-speed mode (HS MODE) of M-PHY) is designed to be 1 μs. For the lowest M-PHY HS-G1A, the period of each bit is 801 ns (corresponding to 1/1248 Mbps). In a channel of a serializer/deserializer (SERDES), the time of each symbol is 10 bits*0.802 ns=8.01 ns. The time of 64 symbol intervals (SI) is 64*8.01 ns=512 ns. Thus, in this embodiment, the time of the minimum distance is set to be 1 μs to satisfy the proximity rule (keeping the distance of 32 PA_PDUs (64 SIs)). The time of this minimum distance is sufficient for other higher data rates. The above calculation is for high-speed mode (HS) rates. For M-PHY low-speed mode (LS) rates (corresponding to the PWM mode), the value of the minimum distance to be checked is 256 μs (64*10 bits*(⅓ Mbps)=213.12 μs) in the low-speed mode (LS) but not the value (1 μs) in the high-speed mode (HS). Thus, the de-skew interval (PA_Vendor_DeSkew_Interval) may be determined and programmed by an application layer, for example, a program, so as to satisfy the proximity rule. Moreover, the minimum value of the de-skew interval may be implemented by defining other attributes in the management information base; for example, in addition to setting the value of the "de-skew interval" in the management information base 312, the minimum value of the high-speed mode and the minimum value of the low-speed mode are also set.

The logic unit 527 adaptively sends a de-skew request for periodic de-skew patterns according to the first, second, and third check result signals above. For example, the logic unit 527 uses a logic circuit, for example, a combination of an AND gate, an OR gate, and a NOR gate or other gates, or any appropriate circuit to implement the determination operation. In one embodiment, the logic unit 527 may be configured to send the de-skew request when the first, second, and third check result signals indicate that all of the criteria 1, 2, and 3 are satisfied. In another embodiment, the logic unit 527 may be configured to send the de-skew request when the de-skew interval request signal (De-Skew_Interval_Request) is asserted, the frame busy signal (frame busy) is de-asserted and the minimum distance mask signal (Minimum_Distance_Mask) is de-asserted, and to not sent the de-skew request when the de-skew interval request signal is asserted but one or both of the frame busy signal and the minimum distance mask signal are asserted. The logic unit 527 indicates the de-skew request by sending one pulse wave or setting an output signal to be asserted.

Moreover, when the TX_Burst signal is turned off due to the MK2 control symbol and the de-skew pattern is to be transmitted at the same time, the de-skew pattern is interrupted. That is, when the TX_Burst signal changes to be de-asserted, it means that the burst transmission halted, and the periodic de-skew pattern transmission is also halted. For example, the de-skew interval checking unit 521 outputs the first check result signal that is de-asserted to represent the above situation.

The second de-skew request circuit 502 is capable of achieving the object of period de-skew pattern transmission in a non-auto mode according to the "de-skew interval" and the "criteria" in the foregoing embodiments, so as to prevent loss in lane synchronization, especially in a scenario when multiple lanes are used. By adaptively sending a de-skew request for periodic de-skew patterns, the probability of error recovery caused by the issue of lane synchronization in a non-auto mode is reduced, thereby helping to enhance the performance of burst transmission.

Referring to FIG. 6, a schematic timing diagram of a de-skew request generation circuit in FIG. 5 is illustrated according to an embodiment. FIG. 6 shows a common situation of sending periodic de-skew patterns of the scenario 1 above. In FIG. 6, the uppermost waveform is a symbol clock (for example, a symbol clock of TX RMMI). At the time point T1, the TX_Burst signal set as asserted indicates that a burst transmission is about to start, and thus the TX sends the de-skew request. Then, when each period according to the de-skew interval is reached, for example, the time points T5 and T8, the de-skew request is sent. In FIG. 6, the frame busy signal indicates whether there is frame busy of a PACP frame or a DL frame. At the time points T1 to T8, the frame busy signal is de-asserted, and so it means that there is no frame busy of a PACP frame or a DL frame. Thus, at the time points T5 and T8, sending of the de-skew request is allowed.

In one embodiment, two counters may be implemented so help the implementation of the de-skew interval checking unit 521 and the minimum distance checking unit 525. Each time the TX_Burst signal is set to be asserted, the two counters re-load the value of the de-skew interval (PA_Vendor_DeSkew_Interval). The operations of the two counters keep going until the TX_Burst signal is set to be de-asserted.

For example, the two counters are respectively referred to as a de-skew interval checking counter and a minimum distance checking counter. The de-skew interval checking counter is for decrementing the value from PA_Vendor_DeSkew_Interval −1 to 0 every 1 µs, and then repeating the above decremental counting operation until the TX_Burst signal is turned off. A counter signal output by the de-skew interval checking counter can be denoted as "De-Skew_Interval_Counter".

The minimum distance counter is for decrementing the value from PA_Vendor_DeSkew_Interval −1 to a minimum value (for example, value 1: fast mode; or value 256: slow mode) every 1 µs, keeping the value until the next pulse wave of the de-skew interval request signal (for example, De-Skew_Interval_Request) is sent, and then repeating the above decremental counting operation. A counter signal output by the minimum distance counter may be denoted as "Minimum_Distance_Counter". Upon the counter value of the minimum distance counter having reached the minimum value (for example, represented by MIN in FIG. 6 and FIG. 7), the minimum distance mask signal (which may be denoted as Minimum_Distance_Mask) is set to be asserted (for example, at the time points T4 to T5) to disable sending of the de-skew pattern, until the pulse wave of the next de-skew interval request signal (De-Skew_Interval_Request) is sent.

For example, the above de-skew interval checking counter may be implemented in the de-skew interval checking unit 521. For another example, the above minimum distance counter may be implemented in the minimum distance checking unit 525.

Referring to FIG. 7, a schematic timing diagram of a de-skew request generation circuit in FIG. 5 is shown according to another embodiment. FIG. 7 shows an example of sending of the periodic de-skew pattern encountering the case of frame busy as in the above scenarios 2 to 4. In FIG. 7, at the time point T1, the TX_Burst signal set as asserted indicates that a burst transmission is about to start, and thus the de-skew request is sent. At the time points T3 to T7, the frame busy signal (frame busy) is asserted to indicate frame busy, for example, a PACP frame or DL frame is being transmitted. The de-skew request is configured to be sent when each period according to the de-skew interval is reached, but the sending thereof is postponed in the presence of frame busy at the time point T5. At the time point T7, the frame busy signal changes to be de-asserted. However, because the time interval from the time point T7 to the time point T8 at which the next de-skew request is predetermined to be sent is less than the minimum distance (for example, less than 1 µs), the minimum distance checking is not satisfied and is thus masked (or referred to as canceled). Next, at the time point T8, the de-skew request is sent according to the de-skew interval, wherein there is no longer frame busy of the PACP frame or the DL frame.

Moreover, in some embodiments, an application (for example, a UniPro application layer) of an interconnection protocol can combine the periodic de-skew pattern with monitoring of quality of service (QoS). The application can dynamically modify the value of the de-skew interval (PA_Vendor_DeSkew_Interval). When the channel quality is poor, for example, the error rate is increased, the value of the de-skew interval can be lowered. This implies that both the host and the device can be synchronized as soon as possible in a non-auto mode. When the channel quality cannot be improved or the value of the de-skew interval cannot be lowered, the application may report a severe error.

In some embodiments of the controller or the storage device above, the controller or the storage device is further configured to modify a value of the de-skew interval dynamically according to an indication signal for quality of service (QoS) of the link layer when the de-skew interval is greater than a minimum value that is allowable.

Figure 8:
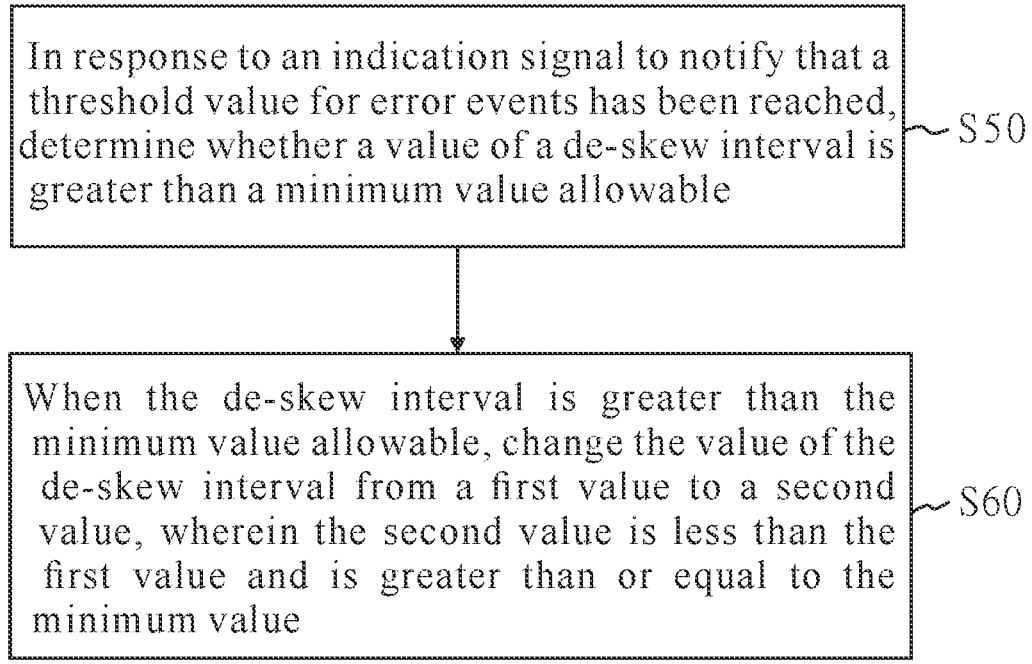
FIG. 8 is a flowchart of adaptively utilizing periodic de-skew patterns according to an embodiment of the present invention.
Figure 9:
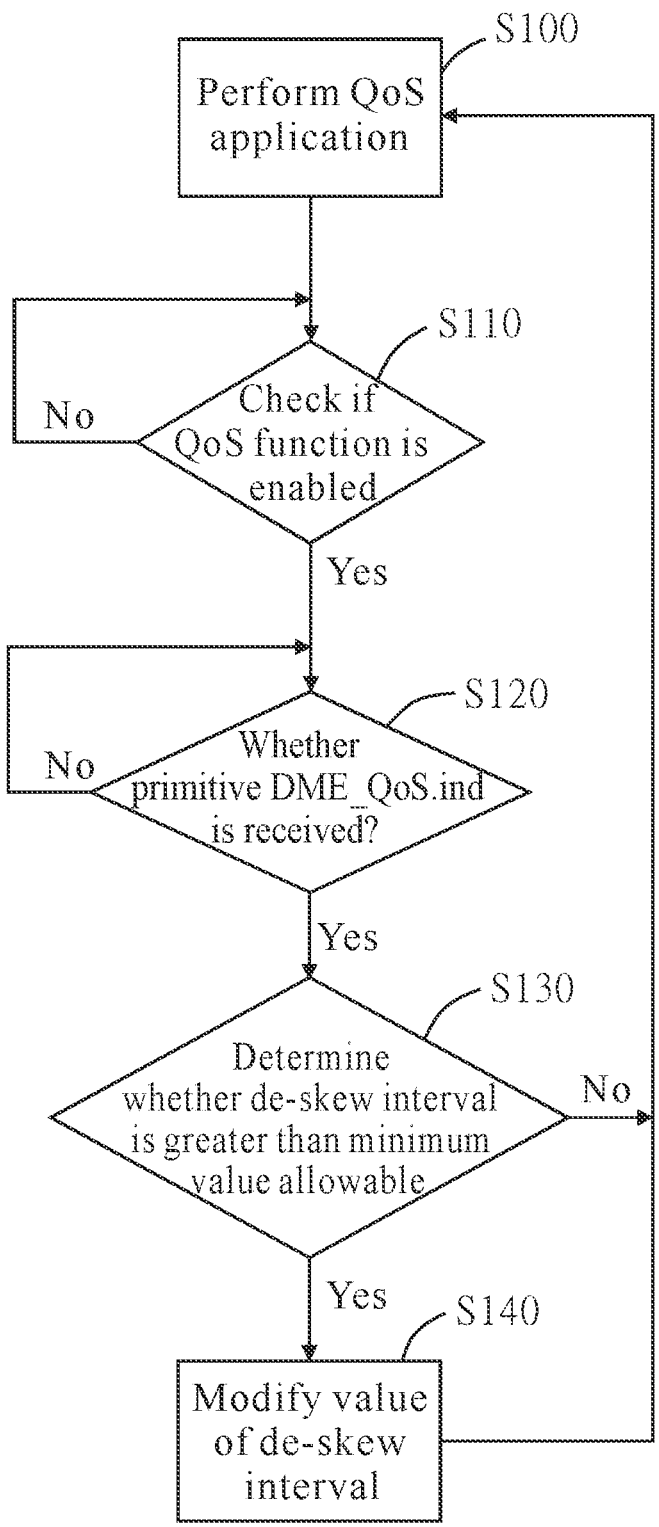
FIG. 9 is a flowchart of adaptively utilizing periodic de-skew patterns according to yet an embodiment of the present invention.

FIG. 8 and FIG. 9 are flowcharts of adaptively utilizing periodic de-skew patterns according to yet another embodiment. Taking the UniPro version 1.8 and later for example, execution of a link QoS function is provided, and a UniPro link layer is capable of independently monitoring forward and reverse links by communicating with the RMMI and M-PHY. Once the QoS function is enabled, a circuit implemented according to this UniPro specification is capable of providing QoS records, for example, a symbol count within a desired time window and the number of error events, a QoS parameter such as a corresponding threshold for error events that is programmable by a program, or a UniPro circuit sending an indication to notify an application layer when the number of error events has reached the threshold value, for example, sending a primitive DME_QOS.ind to notify the application layer of having reached of the threshold value.

As shown in FIG. 8, according to an embodiment, adaptive utilizing the de-skew pattern includes multiple operations to dynamically modify the de-skew interval, the operations including: step S50, determining whether or not the value of the de-skew interval is greater than a minimum value that is allowable in response to the indication signal (for example, the foregoing DME_QOS.ind) notifying that the threshold value of the error events has been reached; and step S60, the value of the de-skew interval is changed from a first value to a second value when the value of the de-skew interval is greater than the minimum value that is allowable, wherein the second value is less than the first value and is greater than or equal to the minimum value that is allowable.

In some examples, the host 10 or the storage device 20 can be configured to perform the operations in FIG. 8, and coordinate with the method in FIG. 3 to dynamically promote lane synchronization. The operations in FIG. 8 can be implemented by a logic circuit corresponding to the operations in FIG. 8 that is provided in the hardware protocol engine of the host 10 or the storage device 20. The logic circuit can be coupled to the device management entity (DME) (135 or 235) to thereby obtain the indication signal. The logic circuit can obtain QoS-related parameters or functions by using a primitive or service access point (SAP) provided by the device management entity implemented according to the UniPro specification.

Moreover, the operations in FIG. 8 may also be implemented in the host 10 or the storage device 20 by means of firmware or software. In the embodiment in FIG. 9, the value of the de-skew interval (PA_Vendor_DeSkew_Interval) can be dynamically modified by using an application. FIG. 9 is illustrated in terms of an application, which may be, for example, implemented in the host or the storage device by means of firmware, for example, be executed by the processing unit 14 of the host 10, or be executed by the processing unit 24 of the storage device 20. The circuit implemented by the UniPro specification above provides the QoS function, and can be implemented by the hardware protocol engine 13 of the host 10 or the hardware protocol engine 23 of the storage device 20. As such, hardware circuits and firmware (for example, an application) can operate collaboratively and cooperate with each other, so as to dynamically modify the de-skew interval by a more flexible implementation means to promote lane synchronization, thereby improving transmission performance.

In step S100, an application is executed to perform a QoS application.

In step S110, it is checked whether or not the QoS function is enabled. If the function is enabled, step S120 is further performed, otherwise waiting in the original state is continued to determine whether or not the function is enabled.

In step S120, if the QoS function is enabled, it is determined whether or not the primitive DME_QoS.ind indicating the number of times error events having reached the error threshold value is received. If the primitive is received, step S130 is further performed, otherwise waiting in the original state is continued to determine whether or not the primitive is received.

In step S130, it is determined whether or not the de-skew interval (PA_Vendor_DeSkew_Interval) is greater than the minimum value that is allowed (as described in Table-2). If so, step S140 is performed; if not, the process returns to step S100, wherein the value of the de-skew interval is no longer modifiable.

In step S140, if it is determined that the de-skew interval (PA_Vendor_DeSkew_Interval) is greater than the minimum value allowable, the value of the de-skew interval is modified, for example, decreasing the value. As shown in FIG. 9, once the value of the de-skew value is modified, the process may return to step S100, or other appropriate operations needed may be performed.

Thus, when the QoS monitoring function is enabled (which may correspond to inbound, outbound, or PA_INIT), the application waits for DME_QoS.ind. If DME_QoS.ind is set to be asserted, the application can decrease the value the de-skew interval (PA_Vendor_DeSkew_Interval) until the value of the de-skew interval (PA_Vendor_DeSkew_Interval) is decreased to the minimum value (the minimum value 1 in the fast mode and the value 256 in the slow mode).

In an example of step S140 (or step S60), when the burst transmission begins in the fast mode, the de-skew interval (PA_Vendor_DeSkew_Interval) is set to be 1000. After the application receives DME_QoS.ind, the application notifies a physical adapter layer (for example, 131 or 231 in FIG. 2, and 300 in FIG. 3C) by a related primitive of the DME (for example, 135 or 235 in FIG. 2), and the physical adapter layer (for example, 300 or 310 in FIG. 3C) changes the value of the de-skew interval stored in the management information base 312 to 500. If the application again receives DME_QoS.ind, the physical adapter layer (for example, 300 or 310 in FIG. 3C) can again decrease the value of the de-skew interval (for example, setting to 450, 400, 350, or 300). As such, the application can repeat the operations above until the value of the de-skew interval reaches the minimum value (for example, 1). In another example, in the slow mode, the similar operations can be performed, with however the minimum value being 256.

Moreover, in an example, after the QoS is enabled and the value of PA_Vendor_DeSkew_Interval is dynamically decreased, the application calculates an error rate by using the symbol count within the desired time window and the number of error events, thereby confirming whether the error rate is lowered.

In some embodiments of step S140 (or step S60), the approach for modifying the de-skew interval can be determined based on the change of the error rate. For example, the approach for modifying may be configured to yield a positive correlation between the decrement in the de-skew interval and the decrement in the error rate. For example, when the error rate increases, the value of the de-skew interval is decreased (alternatively speaking, shortening the de-skew interval), in the aim of reducing the error rate.

In some embodiments of step S140 (or step S60), further, after the value of the de-skew interval is modified, it is determined to whether again modify the de-skew interval according to a change condition of the error rate. For example, when the value of the de-skew interval is decreased and the error rate monitored by the application is also decreased, it means that the above approach for modifying is effective; if the error rate has not yet reached a required value, it can be determined to again decrease the value of the de-skew interval. For another example, if the error rate is not decreased or is only decreased moderately after the value of the de-skew interval is decreased (for once or multiple times), it means that the factor of the error rate does lie in the issue of de-skew, and it can be determined that the value of the de-skew interval is not to be further decreased.

Thus, in the description of the related embodiments based on FIG. 8 and FIG. 9, the value of the de-skew interval is further dynamically modified on the basis of the implementation of adaptively sending the periodic de-skew pattern (for example, based on FIG. 3A or the embodiment thereof) to prevent loss of lane synchronization, and this has demonstrated that the technique for helping to enhance transmission quality is feasible.

Moreover, in the present disclosure, "asserting" a signal (or other alternative forms such as "asserted" or "assertion") means that a signal is set to be in an active state (or an active voltage level), which may be a high or low level. "De-asserting" a signal (or other alternative forms such as "de-asserted" or "de-assertion") means that a signal is set to be in an inactive state (or an inactive voltage level), which may be a high or low level. If a signal is set to be at a low level to represent active-low, "asserting" the signal means that the signal is set to a low level, and "de-asserting" the signal means that the signal is set to a high level. If a signal is set to be at a high level to represent active-high, "asserting" a signal means that the signal is set to a high level, and "de-asserting" the signal means that the signal is set to a low level.

Moreover, in the embodiments related to the host and the storage device above, the hardware protocol engine in the host controller or the device controller can be designed based on Hardware Design Language (HDL) such as Verilog or techniques of any other design methods of digital circuits generally known to a person skilled in the art, and can be implemented by one or more of circuits based on such as a field programmable gate array (FPGA), an application-specific integrated circuit (ASIC), or a complex programmable logic device (CPLD), or be implemented by a dedicated circuit or module. The host controller or the device controller (or a processing unit or a hardware protocol engine therein) can also be based on a microcontroller, a processor, or a digital signal processor (DSP).

As described above, various embodiments of the technique for lane synchronization for an interconnection protocol are provided, for example, a method for lane synchronization for an interconnection protocol, a controller, and a storage device.

The present disclosure is described by way of the multiple embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A method for lane synchronization in a first device, the method comprising:
   providing data representing a de-skew interval that indicates a time interval between two consecutive periodic de-skew patterns;
   performing, by a hardware protocol engine configured according to a link layer of an interconnection protocol, periodic de-skew pattern transmission adaptively over lanes from the first device to a second device according to the de-skew interval and in response to communication status information between the first device and the second device during a burst transmission; and
   modifying a value of the de-skew interval dynamically according to an indication signal for quality of service (QoS) of the link layer when the de-skew interval is greater than a period threshold value of the de-skew interval;
   wherein the hardware protocol engine is configured to send a de-skew pattern periodically according to the de-skew interval when the communication status information satisfies a criterion for performing the periodic de-skew pattern transmission, and to postpone sending the de-skew pattern when the communication status information does not satisfy the criterion.

2. The method according to claim 1, wherein the communication status information includes a burst transmission indication signal and frame busy information.

3. The method according to claim 2, wherein the criterion includes that the burst transmission indication signal indicates the burst transmission in progress, that a period according to the de-skew interval is reached, and that the frame busy information indicates no frame transmitted.

4. The method according to claim 3, wherein the hardware protocol engine is configured to send the de-skew pattern in response to determining that the burst transmission indication signal indicates the burst transmission in progress, that a period according to the de-skew interval is reached, and that the frame busy information indicates no frame transmitted.

5. The method according to claim 3, wherein the hardware protocol engine is configured to postpone sending the de-skew pattern in response to determining that the burst transmission indication signal indicates the burst transmission in progress, that the period according to the de-skew interval is reached, and that the frame busy information indicates a frame transmitted.

6. The method according to claim 5, wherein the hardware protocol engine is configured, in response to determining that the burst transmission indication signal indicates the burst transmission in progress, that the period according to the de-skew interval is reached, and that the frame busy information indicates no frame transmitted, to further check whether a time interval between a current time point and a time point at which a next period according to the de-skew interval is reached is greater than or equal to a period threshold value of the de-skew interval.

7. The method according to claim 6, wherein the hardware protocol engine is configured to send the de-skew pattern when the time interval is greater than or equal to the period threshold value of the de-skew interval.

8. The method according to claim 1, wherein the interconnection protocol is Universal Flash Storage (UFS) standard.

9. A controller disposed in a first device, the controller comprising:
   an interface circuit configured according to a physical layer of the interconnection protocol to link to a second device; and
   a hardware protocol engine, coupled to the interface circuit, configured according to a link layer of an interconnection protocol, wherein the hardware protocol engine is configured to perform periodic de-skew pattern transmission adaptively over lanes from the first device to the second device according to a de-skew interval and in response to communication status information between the first device and the second device during a burst transmission, wherein the de-skew interval indicates a time interval between two consecutive periodic de-skew patterns;
   wherein the controller is further configured to modify a value of the de-skew interval dynamically according to an indication signal for quality of service (QoS) of the link layer when the de-skew interval is greater than a period threshold value of the de-skew interval; and
   wherein the hardware protocol engine is configured to send a de-skew pattern periodically according to the de-skew interval when the communication status information satisfies a criterion for performing the periodic de-skew pattern transmission, and to postpone sending the de-skew pattern when the communication status information does not satisfy the criterion.

10. The controller to according to claim 9, wherein the communication status information includes a burst transmission indication signal and frame busy information.

11. The controller according to claim 10, wherein the criterion includes that the burst transmission indication signal indicates the burst transmission in progress, that a period according to the de-skew interval is reached, and that the frame busy information indicates no frame transmitted.

12. The controller according to claim 11, wherein the hardware protocol engine is configured to send the de-skew pattern in response to determining that the burst transmission indication signal indicates the burst transmission in progress, that a period according to the de-skew interval is reached, and that the frame busy information indicates no frame transmitted.

13. The controller according to claim 12, wherein the hardware protocol engine is configured to postpone sending the de-skew pattern in response to determining that the burst transmission indication signal indicates the burst transmission in progress, that the period according to the de-skew interval is reached, and that the frame busy information indicates a frame transmitted.

14. The controller according to claim 13, wherein the hardware protocol engine is configured, in response to determining that the burst transmission indication signal indicates the burst transmission being in progress, that the period according to the de-skew interval is reached, and that the frame busy information indicates no frame being transmitted, to further check whether a time interval between a current time point and a time point at which a next period according to the de-skew interval is reached is greater than or equal to the period threshold value of the de-skew interval.

15. The controller according to claim 14, wherein the hardware protocol engine is configured to send the de-skew pattern when the time interval is greater than or equal to the period threshold value of the de-skew interval.

16. The controller according to claim 9, wherein the controller further comprises:
a de-skew request circuit, disposed in the hardware protocol engine, that performs periodic de-skew request transmission adaptively according to the de-skew interval and in response to communication status information between the first device and the second device during a burst transmission, wherein the de-skew request circuit sends a de-skew request periodically according to the de-skew interval when the communication status information satisfies the criterion, and the de-skew request circuit postpones sending the de-skew request when the communication status information does not satisfy the criterion;
wherein the hardware protocol engine is configured to send the de-skew pattern over the lanes from the first device to the second device in response to the de-skew request.

17. The controller according to claim 9, wherein the controller further comprises a processing unit coupled to the hardware protocol engine and configured to modify the value of the de-skew interval dynamically according to the indication signal for quality of service (QoS) of the link layer when the de-skew interval is greater than the period threshold value of the de-skew interval.

18. The controller according to claim 17, wherein the processing unit is configured to perform a plurality of operations to modify the de-skew interval dynamically, the plurality of operations comprising:
in response to the indication signal that a threshold value for error events is reached, determining whether the value of the de-skew interval is greater than the period threshold value of the de-skew interval; and
changing the value of the de-skew interval from a first value to a second value when the value of the de-skew interval is greater than the minimum value, wherein the second value is less than the first value and is greater than or equal to the period threshold value of the de-skew interval.

19. The controller according to claim 9, wherein the period threshold value of the de-skew interval is a minimum value.

20. The controller according to claim 19, wherein the controller is further configured to perform a plurality of operations to modify the de-skew interval dynamically, the plurality of operations comprising:
in response to the indication signal that a threshold value for error events is reached, determining whether the value of the de-skew interval is greater than the period threshold value of the de-skew interval; and
changing the value of the de-skew interval from a first value to a second value when the value of the de-skew interval is greater than the minimum value, wherein the second value is less than the first value and is greater than or equal to the period threshold value of the de-skew interval.

21. The controller according to claim 9, wherein the interconnection protocol is Universal Flash Storage (UFS) standard.

22. A storage device comprising:
a storage module; and
a controller, coupled to the storage module, implementing configured according to an interconnection protocol, the controller comprising:
an interface circuit implementing configured according to a physical layer of the interconnection protocol to link to a host; and
a hardware protocol engine, coupled to the interface circuit, configured according to a link layer of the interconnection protocol, wherein the hardware protocol engine is configured to perform periodic de-skew pattern transmission adaptively over lanes from the storage device to the host according to a de-skew interval and in response to communication status information between the storage device to the host during a burst transmission, wherein the de-skew interval indicates a time interval between two consecutive periodic de-skew patterns;
wherein the controller is further configured to modify a value of the de-skew interval dynamically according to an indication signal for quality of service (QoS) of the link layer when the de-skew interval is greater than a period threshold value of the de-skew interval;
wherein the hardware protocol engine is configured to send a de-skew pattern periodically according to the de-skew interval when the communication status information satisfies a criterion for performing the periodic de-skew pattern transmission, and to postpone sending the de-skew pattern when the communication status information does not satisfy the criterion.

23. The storage device according to claim 22, wherein the period threshold value of the de-skew interval is a minimum value.

24. The storage device according to claim 22, wherein the storage device further comprises a processing unit coupled to the hardware protocol engine and configured to modify the value of the de-skew interval dynamically according to the indication signal for quality of service (QoS) of the link layer when the de-skew interval is greater than the period threshold value of the de-skew interval.

25. The storage device according to claim 22, wherein the interconnection protocol is Universal Flash Storage (UFS) standard.

26. The method according to claim 1, wherein the period threshold value of the de-skew interval is minimum value of the de-skew interval that is allowable.

27. The controller according to claim 9, wherein the period threshold value of the de-skew interval is minimum value of the de-skew interval that is allowable.

28. The controller according to claim 19, wherein the period threshold value of the de-skew interval is minimum value of the de-skew interval that is allowable.

29. The storage device according to claim 22, wherein the period threshold value of the de-skew interval is minimum value of the de-skew interval that is allowable.

* * * * *